US012624148B2

(12) United States Patent
Tsou et al.

(10) Patent No.: US 12,624,148 B2
(45) Date of Patent: May 12, 2026

(54) THERMOPLASTIC POLYURETHANE FOAM AND IMPACT RESISTANT COMPOSITE LAMINATE COMPRISING THE SAME

(71) Applicant: SUNKO INK CO., LTD., Taichung City (TW)

(72) Inventors: Chiu-Peng Tsou, Taichung City (TW); Zhen-Wei Chen, Taichung City (TW); Ting-Ti Huang, Taichung City (TW); Sheng-Mao Tseng, Taichung City (TW)

(73) Assignee: SUNKO INK CO., LTD., Taichung City (TW)

( * ) Notice: Subject to any disclaimer, the term of this patent is extended or adjusted under 35 U.S.C. 154(b) by 981 days.

(21) Appl. No.: 17/857,654

(22) Filed: Jul. 5, 2022

(65) Prior Publication Data

US 2023/0220146 A1 Jul. 13, 2023

(30) Foreign Application Priority Data

Jan. 12, 2022 (TW) .................................. 111101309

(51) Int. Cl.

*C08G 18/08* (2006.01)
*B32B 5/24* (2006.01)
*C08G 18/12* (2006.01)
*C08G 18/32* (2006.01)
*C08G 18/48* (2006.01)
*C08J 9/42* (2006.01)
*C08G 101/00* (2006.01)

(52) U.S. Cl.

CPC .............. *C08G 18/14* (2013.01); *B32B 5/245* (2013.01); *C08G 18/12* (2013.01); *C08G 18/3206* (2013.01); *C08G 18/4804* (2013.01); *C08G 18/4833* (2013.01); *C08G 18/4854* (2013.01); *C08J 9/42* (2013.01); *C08G 2101/00* (2013.01); *C08G 2110/0041* (2021.01); *C08J 2203/06* (2013.01); *C08J 2203/08* (2013.01); *C08J 2375/08* (2013.01)

(58) Field of Classification Search

CPC ......... B32B 5/022; B32B 5/024; B32B 5/026; B32B 5/18; B32B 5/245; B32B 5/26; B32B 5/32; B32B 9/025; B32B 9/046; B32B 27/065; B32B 2262/101; B32B 2266/0278; B32B 2307/558; B32B 2307/7376; B32B 2571/00; C08G 18/12; C08G 18/14; C08G 18/3206; C08G 18/4018; C08G 18/4216; C08G 18/425; C08G 18/4804; C08G 18/4833; C08G 18/4854; C08G 18/6607; C08G 18/664; C08G 18/6674; C08G 18/7671; C08G 2101/00; C08G 2110/0041; C08J 9/122; C08J 9/18; C08J 9/228; C08J 9/232; C08J 9/42; C08J 2203/06; C08J 2203/08; C08J 2375/04; C08J 2375/08; Y02P 20/54

See application file for complete search history.

(56) References Cited

U.S. PATENT DOCUMENTS

| | | | | |
|---|---|---|---|---|
| 4,529,744 A * | 7/1985 | Wood | ................. | C08G 18/6674 252/182.25 |
| 5,456,658 A | 10/1995 | Duback | | |
| 7,381,460 B2 | 6/2008 | Palmer | | |

FOREIGN PATENT DOCUMENTS

| | | | | |
|---|---|---|---|---|
| CN | 101974147 | A | | 2/2011 |
| CN | 111518306 | A | | 8/2020 |
| CN | 211493096 | U | * | 9/2020 |
| JP | 2017197736 | A | | 11/2017 |
| TW | 200704662 | A | | 2/2007 |
| TW | 202012539 | A | | 4/2020 |
| TW | 202022030 | A | | 6/2020 |
| TW | I697512 | B | | 7/2020 |
| TW | 202028279 | A | * | 8/2020 |
| TW | 202041377 | A | | 11/2020 |

OTHER PUBLICATIONS

English Translation of TW 202028279 A (Year: 2020).*
English Translation of CN 111518306 A (Year: 2020).*
English Translation of CN-211493096-U (Year: 2020).*
Stepanpol Product Bulletin, Jun. 2012, published by Stepan Company, webpage <URL: https://www.stepan.com/content/dam/stepan-dotcom/webdam/website-product-documents/productbulletins/polymers/STEPANPOLPS3152.pdf>.

* cited by examiner

*Primary Examiner* — John M Cooney
(74) *Attorney, Agent, or Firm* — WPAT, PC

(57) ABSTRACT

Provided are a thermoplastic polyurethane foam and an impact resistant composite laminate. The thermoplastic polyurethane comprises a structural unit represented by Formula (I):

(I)

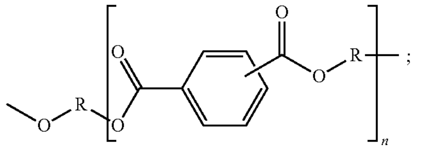

wherein each R independently is an alkylene group having 2 to 8 carbon atoms or $-CH_2CH_2OCH_2CH_2-$ or $-CH_2CH_2OCH_2CH_2OCH_2CH_2-$; n is a number from 2 to 13; and the structural unit has a Mn ranging from 700 g/mole to 2500 g/mole. The impact resistant composite laminate comprises a base layer and a first impact resistant layer formed by the thermoplastic polyurethane foam, and the first impact resistant layer overlaps the base layer.

18 Claims, 7 Drawing Sheets

THERMOPLASTIC POLYURETHANE FOAM AND IMPACT RESISTANT COMPOSITE LAMINATE COMPRISING THE SAME

CROSS-REFERENCE TO RELATED APPLICATION

Pursuant to 35 U.S.C. § 119(a), this application claims the benefit of the priority to Taiwan Patent Application No. 111101309, filed on Jan. 12, 2022. The content of the prior application is incorporated herein by its entirety.

BACKGROUND OF THE INVENTION

1. Field of the Invention

The present disclosure relates to a thermoplastic polyurethane (TPU) foam, and more particular to a TPU foam used as an impact resistant layer. The present disclosure also relates to an impact resistant composite laminate comprising the same.

2. Description of the Prior Arts

Generally speaking, grips of hand tools, walking sticks, clubs, guns, bicycles, motorcycles and multiple sport goods are made of hard materials such as metals, rigid plastics and woods. Accordingly, vibrations are directly transmitted to the users' hands when the grips are in use, and therefore the users will be uncomfortable after holding these grips for a long time. In addition, while standing, walking and exercising, people's feet not only support the weight of the body but also withstand the reaction force from the ground where the feet tread. Some muscles, tendons and bones continuously withstand a force from the weight of the body because of sitting, lying down or maintaining a posture for a prolonged period of time. A person may fall over during an activity, causing the body to hit against the ground and get injured. An athlete's body may be injured because of a high impact hit during exercise such as catching a ball, hitting a ball, bumping or falling over. Further, fragile goods or precision instruments may be damaged by vibrations or collision. In order to solve the problems, industries, such as footwear, sports protection, instrument protection and medical protection, hope to develop protective products which can effectively dissipate vibrations, resist impact and satisfy the need of lightweight.

For example, U.S. Pat. No. 5,456,658A provides a custom-fitting body part protector. The body part protector has a protective layer composed of a glass fiber impregnated with a moisture-curable resin. The body part protector is sealed in an outer moisture-proof protective pouch until the protective layer of the body part protector covers the body part to be protected. The initially flexible protective layer may quickly harden upon curing to form a rigid pad structure in the presence of sufficient moisture. Since the protective layer covers a body part to be protected from the beginning, the pad formed by the cured protective layer maintains the molded structure which fits the body part. However, the moisture-curable resin cannot be reshaped anymore once fully cured.

U.S. Pat. No. 7,381,460B2 provides an energy absorbing composite, which relates to the famous impact protection material, D3O. The energy absorbing composite contains a solid foamed synthetic elastomeric polyurethane (PU) matrix, and polyborodimethylsiloxane (PBDMS) is added as a dilatant and is dispersed throughout the matrix during the manufacture of the matrix. The resulting energy absorbing composite is resiliently compressible.

In recent years, people pay a great attention to sustainable development; therefore, the circular economy focusing on "resource recycling and reuse" is booming, and the footwear and sports equipment industries actively participate in this trend. If environmental-friendly thermoplastic elastomer materials such as thermoplastic polyester resins and TPU are used to replace environmentally unfriendly materials, such as PUs and thermosetting silicones, it is conducive to recycle the impact protection materials from the waste, and the model of green consumption behavior can be constructed.

JP2017-197736A provides a polyester resin composition for vibration-damping material. The composition includes a thermoplastic polyester resin (A) constituted of a dicarboxylic acid component and a diol component, a plasticizer (B) of a diphenyl compound represented by a specified structure, and an inorganic filler (C).

TW 202022030A filed by Basf SE provides foam beads formed by a composition comprising: a TPU including a structural unit derived from polytetramethylene ether glycol (PTMEG), a styrene polymer and a specific toughness modifier. The molded article made from the aforesaid foam beads has a resilience of higher than 55%; however, this disclosure does not teach the impact resistance thereof. One person skilled in the art would recognize that the impact resistance of the foam cannot be directly inferred from the resilience of the foam.

In addition, TW200704662A provides a flexible PU foam, produced by a process which comprises reacting a polyol mixture with a polyisocyanate compound in the presence of a urethane-forming catalyst, a blowing agent and a foam stabilizer; wherein the polyol mixture comprises a polyether-based polyol and a monool. The flexible PU foam is a cross-linked thermosetting plastic; without using a plasticizer, the resulting flexible PU foam still has low resiliency and low temperature responsivity as well as high air permeability, so it is particularly suitable for bedding such as mattresses and pillows. However, this disclosure also does not teach the impact resistance of the flexible PU foam.

TWI697512B is the prior art most relevant to the present disclosure. It provides a TPU having a glass transition temperature (Tg) between an ambient temperature and normal body temperature. Aforesaid TPU may be a TPU including a dicarboxyphenyl polyester structural unit or a TPU including a 10-(2,3-dicarboxypropyl)-9,10-dihydro-9-oxa-10-phosphaphenanthrene-10-oxide (DOPO-ITA) polyester structural unit. The article produced by the TPU is rigid and stiff at ambient temperature and soft and elastic at normal body temperature when contacting the human body. Accordingly, the article can confer a new tactility and delight when it contacts the human body. The patent only discloses a nonwoven film directly made by the aforesaid TPU and a solvent-free hot melt adhesive, and the patent mainly emphasizes the softness and comfort while in contact with the human body; however, the patent does not explore or disclose any information about a foam produced by a foaming process of the TPU, nor the impact resistance of the TPU foam.

SUMMARY OF THE INVENTION

In view of the conventional technical defects, an objective of the present disclosure is to provide a TPU foam, which has a good impact resistance to cushion external force effectively.

To achieve the foresaid objective, the present disclosure provides a TPU foam, which is prepared by a foaming process from a raw material comprising a TPU.

Wherein, the TPU comprises a structural unit represented by Formula (I):

(I)

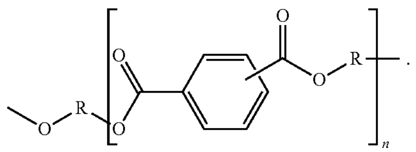

In Formula (I), each R independently is an alkylene group having 2 to 8 carbon atoms, $—CH_2CH_2OCH_2CH_2—$ or $—CH_2CH_2OCH_2CH_2OCH_2CH_2—$;

n is a number from 2 to 13; and the structural unit represented by Formula (I) has a number-average molecular weight (Mn) ranging from 700 grams per mole (g/mole) to 2500 g/mole.

By means of subjecting the TPU comprising the dicarboxyphenyl polyester structural unit represented by Formula (I) to a foaming process to form the TPU foam, the TPU foam can reduce at least 20% of an impact force when withstanding the impact force. As a result, the TPU foam can be used to prepare an impact resistant layer and be widely used for various protective products.

Preferably, the TPU foam may have a density ranging from 0.15 grams/cubic centimeter ($g/cm^3$) to 1.10 $g/cm^3$, but it is not limited thereto. The aforesaid density is obtained according to ASTM D792 Standard Test Methods for Density and Specific Gravity.

In accordance with the present disclosure, the TPU foam may have closed cells with a cell morphology of a spherical shape or polyhedronal shape; the size of the closed cells may vary by foaming temperature, pressure or thickness of the sample. Preferably, the size of the closed cells may range from 1 micrometer (μm) to 100 μm, but it is not limited thereto.

Preferably, in the overall structural units of the TPU, the structural unit represented by Formula (I) may be in the range from 6 molar percent (mole %) to 25 mole %.

Preferably, in the overall structural units of the TPU, the structural unit represented by Formula (I) may be in the range from 28 weight percent (wt %) to 80 wt %, but it is not limited thereto. In some case, in the overall structural units of the TPU, the structural unit represented by Formula (I) may be in the range from 50 wt % to 80 wt %; in other cases, in the overall structural units of the TPU, the structural unit represented by Formula (I) may be in the range from 30 wt % to 55 wt %.

Preferably, the TPU may comprise a structural unit represented by Formula (II):

(II)

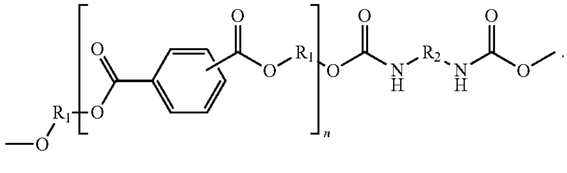

In Formula (II), each $R_1$ independently is an alkylene group having 2 to 8 carbon atoms or $—CH_2CH_2OCH_2CH_2—$ or $—CH_2CH_2OCH_2CH_2OCH_2CH_2—$;

$R_2$ is

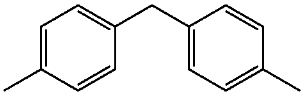

or

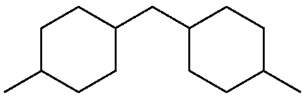

;

and n is a number from 2 to 13. In some embodiments, n may be an integer, but it is not limited thereto.

That is, $R_1$ in Formula (II) corresponds to R in Formula (I), and "n" in Formula (II) is the same as "n" in Formula (I).

Preferably, the TPU has a Tg ranging from 10° C. to 40° C.; more preferably, the TPU has the Tg ranging from 15° C. and 28° C. In the case that the Tg of the TPU is in the above-mentioned range, the TPU foam can be easily molded at a temperature equal to or slightly higher than human body temperature; therefore, the personal protective product prepared by the TPU foam is more practical since the personal protective product prepared by the TPU foam not only fits exactly the shape of the corresponding body part of the user to be protected but also can be repeatedly re-shaped by an elevated temperature.

It can be understood that the raw materials used to make the TPU comprising the structural unit represented by Formula (I) may be made from conventional raw materials, as long as the structural units derived therefrom can conform to the structural unit represented by Formula (I). In some embodiments, the TPU may be obtained by a condensation polymerization which uses a diol with the dicarboxyphenyl polyester structure represented by Formula (I) and a diisocyanate as raw materials. In some other embodiments, the TPU may be obtained by a condensation polymerization which uses a diol with the dicarboxyphenyl polyester structure represented by Formula (I), a chain extender and a diisocyanate as raw materials. In some other embodiments, the TPU may be obtained by a condensation polymerization which uses a diol with the dicarboxyphenyl polyester structure represented by Formula (I), an aliphatic polyether diol, a chain extender and a diisocyanate as raw materials. In addition, the method of producing the TPU can adapt the solvent-free one-shot synthesis method to undergo the condensation polymerization, or the TPU may be obtained by other methods such as described in the embodiments of TWI697512 B, but it is not limited thereto.

Specifically, the structural unit represented by Formula (I) of the TPU may be derived from a diol with the dicarboxyphenyl polyester structure. The diol with the dicarboxyphenyl polyester structure represented by Formula (I) may be derived from a dicarboxyphenyl monomer and a diol monomer.

Preferably, the dicarboxyphenyl monomer may comprise 1,2-benzenedicarboxylic acid, 1,3-benzenedicarboxylic acid, 1,4-benzenedicarboxylic acid or phthalic anhydride.

Preferably, the diol monomer may comprise an aliphatic diol having 2 to 8 carbon atoms such as ethylene glycol, propylene glycol such as 1,2-propanediol and 1,3-propanediol, butanediol such as 1,4-butanediol, 2-methyl-1,3-propanediol, diethylene glycol, pentanediol, neopentyl glycol, hexanediol, 1,4-cyclohexanediol, triethylene glycol, 2-ethyl-1,3-hexanediol, octanediol or any combinations thereof.

Preferably, the diol with the dicarboxyphenyl polyester structure represented by Formula (I) may be selected from a polyester polyol of 1,2-phthalic acid/diethylene glycol (CAS No. 25916-41-0, the chemical formula is $(C_8H_6O_4 \cdot C_4H_{10}O_3)_X$), a polyester polyol of phthalic anhydride/diethylene glycol (CAS No. 32472-85-8) such as the product "STEPANPOL® PD-56" of Stepan, a polyester polyol of 1,2-phthalates/diethylene glycol (CAS No. 25036-56-0, the chemical formula is $(C_{12}H_{12}O_5)_X$), a polyester polyol of 1,2-phthalic acid/1,6-hexanediol (CAS No. 27516-71-8, the chemical formula is $(C_8H_6O_4 \cdot C_6H_{14}O_2)_X$), a polyester polyol of phthalic anhydride/1,6-hexanediol (CAS No. 54797-78-3) such as the product "STEPANPOL® PH-56" of Stepan, and a polyester polyol of 1,2-phthalates/1,6-hexanediol (CAS No. 28725-71-5, the chemical formula is $(C_{14}H_{16}O_4)_X$). Chemical Abstracts Service Number is abbreviated as CAS No.

Preferably, in the case that the TPU comprising the structural unit represented by Formula (II) in which $R_1$ is $-CH_2CH_2OCH_2CH_2-$ and $R_2$ is

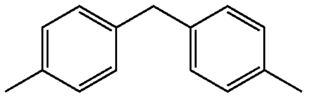
, said TPU may be the TPU of CAS No. 2484808-99-1 which is made from the diol of CAS. No. 25916-41-0 or the TPU which is made from the diol of CAS. No. 32472-85-8. Or, in the case that the TPU comprising the structural unit represented by Formula (II) in which $R_1$ is $-(CH_2)_6-$ and $R_2$ is

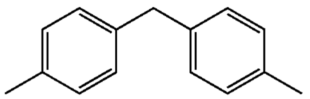
, said TPU may be the TPU of CAS No. 2626937-63-9 which is made from the diol of CAS. No. 27516-71-8 or the TPU which is made from the diol of CAS. No. 54797-78-3.

Preferably, the diol with the dicarboxyphenyl polyester structure represented by Formula (I) may have an OH value between 160.3 mg KOH/g and 56.1 mg KOH/g, but it is not limited thereto.

Preferably, the structural unit represented by Formula (I) may have a Mn ranging from 700 g/mole to 2000 g/mole, but it is not limited thereto.

In accordance with the present disclosure, the diisocyanate may comprise methylene diphenyl diisocyanate (MDI), 4,4'-methylenebis(cyclohexyl isocyanate) (HMDI) or a combination thereof, but it is not limited thereto. Preferably, the diisocyanate may be MDI.

In accordance with the present disclosure, the chain extender may be an aliphatic diol. Preferably, the aliphatic diol may be a diol having 2 to 8 carbon atoms, but it is not limited thereto. For example, the aliphatic diol may be ethylene glycol, propylene glycol, butanediol such as 1,4-butanediol, 2-methyl-1,3-propanediol, diethylene glycol, pentanediol, neopentyl glycol, hexanediol, 1,4-cyclohexanediol, triethylene glycol, 2-ethyl-1,3-hexanediol, octane diol or any combinations thereof, but it is not limited thereto. More preferably, the chain extender may be 1,4-butanediol.

Preferably, a ratio of a sum of mole numbers of the diol with the dicarboxyphenyl polyester structure represented by Formula (I) and the chain extender to a mole number of the diisocyanate may be from 0.95:1 to 1.10:1, but it is not limited thereto.

Specifically, the aliphatic polyether diol may be polyethylene glycol (PEG), a modified PEG, polypropylene glycol, poly trimethylene ether glycol, polytetramethylene ether glycol (PTMEG) or any combinations thereof, but it is not limited thereto. Preferably, the aliphatic polyether diol may be PEG or PTMEG.

Preferably, a ratio of a sum of mole numbers of the diol with the dicarboxyphenyl polyester structure represented by Formula (I), the aliphatic polyether diol and the chain extender to a mole number of the diisocyanate may be from 0.95:1 to 1.10:1, but it is not limited thereto.

In some embodiments, the TPU may be produced by the diol with a structural unit represented by Formula (I), PEG, butanediol and MDI; or, the TPU may be produced by the diol with a structural unit represented by Formula (I), PTMEG, butanediol and MDI, but it is not limited thereto.

Taking convenience of recycling into consideration, the TPU foam preferably may be made of only the TPU. Therefore, it is beneficial for recycling or reusing the TPU from the waste products since the aforementioned TPU foam does not have any plasticizers or any impact-resistant additives.

Preferably, the TPU foam may have a thickness from 1.5 millimeters (mm) to 30 mm; more preferably, the TPU foam may have the thickness from 4 mm to 15 mm, but it is not limited thereto.

In accordance with the present disclosure, the foaming process may be a chemical foaming process or a physical foaming process, but it is not limited thereto. For example, the chemical foaming process may refer to a process which mixes a polymer such as TPU with a chemical foaming agent, and in which the chemical foaming agent may undergo a chemical reaction to produce a gas such as oxygen gas, nitrogen gas, carbon monoxide gas and/or carbon dioxide gas, so the gas will make the polymer expanded and disperse therein to form multiple voids.

The chemical foaming agent may comprise an organic foaming agent or an inorganic foaming agent, but it is not limited thereto; for example, the organic foaming agent may comprise azodicarbonamide, p,p'-oxybisbenzene sulfonyl hydrazide (OBSH) or 5-phenyl-1H-tetrazole; the inorganic foaming agent may comprise sodium bicarbonate, ammonium bicarbonate or calcium carbonate. Preferably, a content of the chemical foaming agent may be not larger than 5% of the total weight of the polymer blend after kneading.

The physical foaming process may be to compress the physical foaming agent by regulating the temperature and pressure, so as to shrink its volume to mix the melt polymer; then, through expansion of the shrunk gas or vaporization of liquid, the gas can disperse in the polymer and form multiple voids therein. Wherein, the physical foaming may comprise nitrogen gas ($N_2$), carbon dioxide gas ($CO_2$), alkanes having a low boiling point or fluorocarbons having a low boiling point, but it is not limited thereto.

Taking energy saving and environment protection of the manufacturing process and the convenience of recovery of the resulting products into consideration, in some embodiments, the TPU foam may be obtained by supercritical foaming molding which is one of the physical foaming processes. For example, the supercritical foaming molding may comprise: (1) a foaming process including a step of supercritical fluid (SCF) impregnation of pellets followed by a foaming step and then a thermoforming step; (2) a foaming process including a step of SCF impregnation of a molded article followed by a foaming step; (3) a foaming process including a foam injection press (IP) step with an SCF; (4) a foaming process including a thermoforming step of foam beads obtained by pelletizing extrusion with an SCF; or (5) a foaming process including an SCF extrusion molding step, but it is not limited thereto.

After the TPU foam is prepared from the TPU by the supercritical foaming molding, the TPU foam may be cut into a desired size; or, a single layer of the TPU foam may be obtained in different thicknesses by adapting different molds. In some embodiments, the single layer of the TPU foam can be used as an impact resistant layer. In other embodiments, several pieces of the TPU foam may be stacked to a desired total thickness as needed, so as to obtain a multi-layered structure of the TPU foam, and the multi-layered structure is used as an impact resistant layer.

Specifically, when the TPU in the form of pellets adapts the foaming process including a step of SCF impregnation followed by a foaming step, the relevant parameters may be set as follows: the SCF being $CO_2$ with a pressure of 100 kgf/cm$^2$; the temperature of the process ranging from 130° C. to 155° C.; the duration of the impregnation ranging from 30 minutes (min) to 60 min. The resulting foam beads then are subjected to a thermoforming step by stream or electric heating, and finally the TPU foam will be obtained. Preferably, a single layer of the TPU foam obtained by the foaming process including a step of SCF impregnation of pellets followed by a foaming step and then a thermoforming step may have a thickness ranging from 6 mm to 30 mm, but it is not limited thereto. For example, the aforesaid resulting TPU foam may have the thickness ranging from 8 mm to 20 mm.

Specifically, in the case that the TPU is formed into a molded article by a thermoforming step or an injection press step first, the molded article will be subjected to a step of SCF impregnation followed by a foaming step, and finally the TPU foam is obtained; wherein the molded article may have a thickness ranging from 1 mm to 10 mm. The relevant parameters may be set as follows: the SCF being $CO_2$; the pressure being usually set in the range from 80 kgf/cm$^2$ to 150 kgf/cm$^2$; the temperature of the process ranging from 75° C. to 155° C.; the duration of the impregnation ranging from 60 min to 120 min. A single layer of the TPU foam obtained by the foaming process including a step of SCF impregnation of the molded article followed by a foaming step may have a thickness ranging from 2 mm to 20 mm, but it is not limited thereto. Preferably, the aforesaid resulting TPU foam may have the thickness ranging from 4 mm to 12 mm.

Specifically, in the case that the TPU foam is obtained by a foam injection press step with an SCF, the relevant parameters may be set as follows: the SCF being liquid nitrogen; the feed inlet temperature ranging from 170° C. to 220° C.; the screw temperature ranging from 160° C. to 200° C.; the nozzle temperature ranging from 160° C. to 180° C.; the injection amount of SCF ranging from 1 gram (g) to 3.5 g. Finally, a resulting TPU foam board may have a thickness ranging from 6 mm to 30 mm which is determined by the mold used, and wherein the thickness of the resulting TPU foam board is covered by a hard skin layer. The resulting TPU foam board may be sliced to form a TPU foam sheet without the hard skin layers; preferably, the aforesaid TPU foam sheet may have a thickness ranging from 4 mm to 12 mm, but it is not limited thereto. The TPU foam board having the hard skin layers is suitable to form an impact resistant layer of reinforced sheaths or sports braces, but it is not limited thereto. On the other hand, the TPU foam sheet without hard skin layers is suitable to form an impact resistant layer of knee pads for kids, but it is not limited thereto.

Preferably, the TPU foam may reduce 20% to 99% of an external impact force when withstanding the impact force. In some embodiments, when withstanding the impact force, the TPU foam may reduce 22%, 35%, 45%, 50%, 60%, 70%, 80%, 85%, 90% or 95% of the impact force, but it is not limited thereto.

Preferably, the TPU foam can achieve Level 1 of European Standard EN1621-1: 2012, which is for motorcyclists' protective clothing against mechanical impact. In the test conditions of EN1621-1: 2012, the test temperature is 23° C., and the impact energy applied to the TPU foam is 50 joules (J). If the mean value of impact energy penetrating through the TPU foam remains below 35 kN and none of that in all single strikes is above 50 kN after the TPU foam is impacted, the TPU foam achieves Level 1 of EN1621-1: 2012. An optional test of T+ (increasing 40° C.) or an optional test of T− (decreasing 10° C.) may be attached.

Preferably, when the aforesaid TPU foam with a single-layered structure or a multi-layered structure is used as an impact resistant layer, an impact resistance per unit thickness of the impact resistant layer may be 6.5%/mm or more, but it is not limited thereto. The "reduced impact ($F_s$)" is the difference obtained from subtracting "penetrating impact ($F_t$)" from "original impact ($F_0$)" (i.e., $F_0$-$F_t$). A reduced impact ratio is the ratio of the "reduced impact ($F_s$)" to the "original impact ($F_0$)". Therefore, the impact resistance per unit thickness of the impact resistant layer is the ratio of the "reduced impact ratio" to the thickness of the impact resistant layer (unit: mm). More preferably, the impact resistance per unit thickness of the impact resistant layer may range from 7%/mm to 22%/mm.

The present disclosure also provides an impact resistant composite laminate. The impact resistant composite laminate comprises a base layer and a first impact resistant layer overlapping the base layer. The first impact resistant layer is formed by the aforementioned TPU foam.

By overlapping the first impact resistant layer formed by the TPU foam and the base layer, the impact resistant composite laminate can reduce at least 20% of an external impact force when withstanding the impact force. Through different choices of the base layer, the impact resistant composite laminate not only provides a good impact resistance but also satisfies the needs in appearance or applications for various products.

Preferably, the first impact resistant layer may have a thickness ranging from 4 mm to 15 mm, but it is not limited thereto. More preferably, the first impact resistant layer may have the thickness ranging from 4.5 mm to 10 mm.

In some embodiments, the impact resistant composite laminate may further comprise a second impact resistant layer, and the base layer may be disposed between the first impact resistant layer and the second impact resistant layer. The second impact resistant layer may be composed of the aforementioned TPU foam.

Further, the first impact resistant layer and the second impact resistant layer may be the same or different. When the first impact resistant layer and the second impact resistant layer are different, the first impact resistant layer and the second impact resistant layer may adapt the same TPU but adopting different foaming processes for preparation; or, the first impact resistant layer and the second impact resistant layer may adapt the same TPU to undergo the same foaming process but they have different thicknesses. The difference between the first impact resistant layer and the second impact resistant layer is not limited to the above two exemplified situations.

In accordance with the present disclosure, the first impact resistant layer and/or the second impact resistant layer may be composed of the TPU foam with a single-layered structure. Or, the first impact resistant layer and/or the second impact resistant layer may be composed of the TPU foam with a multi-layered structure formed by stacking several TPU foam pieces; for example, the multi-layered structure may be a 2-layered, 3-layered or 6-layered structure, but it is not limited thereto. Wherein the TPU foam with the multi-layered structure may be formed by stacking the several TPU foam pieces in a physical manner or by adhering the several TPU foam pieces through a hot press step after stacking, but it is not limited thereto.

In some embodiments, the first impact resistant layer may overlap the base layer in a physical manner such as by directly stacking, inlaying, filling or any combinations thereof, but it is not limited thereto. In other embodiments, the first impact resistant layer may bond to the base layer by a hot press step after overlapping each other. In still other embodiments, the first impact resistant layer and the base layer may be adhered by any conventional adhesive method, but it is not limited thereto.

Preferably, the base layer may comprise a rigid plastic layer, a foam elastomer, a woven fabric, a knit fabric, a nonwoven fabric, a leather, a fiberglass layer or any combinations thereof, but it is not limited thereto.

For example, the material of the rigid plastic layer may comprise polyethene (PE), polypropylene (PP), polyethylene terephthalate (PET) or polycarbonate (PC). Preferably, the rigid plastic layer may have a Shore hardness ranging from 50 D to 90D, but it is not limited thereto.

The material of the foam elastomer may comprise PU, thermoplastic polyolefin (TPO), ethylene-vinyl acetate (EVA), polystyrene (PS, also called styrofoam), or expandable thermoplastic vulcanizate (ETPV) comprising ethylene propylene diene monomer (EPDM) rubber.

The material of a woven fabric, a knit fabric or a nonwoven fabric may comprise thermoplastic resins, but it is not limited thereto. For example, the thermoplastic resins may be thermoplastic polyester, Nylon, TPO, TPU or any combinations thereof, but it is not limited thereto.

The fiberglass layer may be composed of only glass fibers, or composed of a composite material having glass fibers. For example, the composite material having glass fibers may comprise glass fibers and reinforced plastics such as a moisture-curable polyurethane resin (PUR), but it is not limited thereto.

When the base layer is the rigid plastic layer, preferably, the base layer may have a thickness ranging from 1.8 mm to 10 mm.

When the base layer is the foam elastomer, preferably, the base layer may have a thickness ranging from 2 mm to 18 mm.

When the base layer is the woven fabric, the knit fabric, the nonwoven fabric or the leather layer, preferably, the base layer may have a thickness ranging from 0.1 mm to 6.5 mm.

When the base layer is the fiberglass layer, preferably, the base layer may have a thickness ranging from 1 mm to 7 mm.

When the base layer is a rigid plastic layer, preferably, the first impact resistant layer may have a thickness ranging from 2 mm to 10 mm, but it is not limited thereto.

When the base layer is a foam elastomer, preferably, the first impact resistant layer may have a thickness ranging from 2 mm to 10 mm, but it is not limited thereto.

When the base layer is a woven fabric, a knit fabric, a nonwoven fabric or a leather layer, preferably, the first impact resistant layer may have a thickness ranging from 2 mm to 16 mm, but it is not limited thereto.

When the base layer is a fiberglass layer, preferably, the first impact resistant layer may have a thickness ranging from 2 mm to 10 mm, but it is not limited thereto.

In some embodiments, the impact resistant composite laminate may further comprise a surface layer, and the first impact resistant layer may be disposed between the surface layer and the base layer.

Preferably, the surface layer may comprise a rigid plastic layer, a foam elastomer, a woven fabric, a knit fabric, a nonwoven fabric, a leather layer, a fiberglass layer or any combinations thereof, but it is not limited thereto. The surface layer is similar to the aforementioned base layer in composition, preparing method or thickness, so the surface layer can be provided by referring to the base layer.

Preferably, when the impact resistant composite laminate withstands an impact force, the first impact resistant layer of the impact resistant composite laminate may reduce 20% to 99% of the impact force.

In some embodiments, when the impact resistant composite laminate withstands an impact force, the first impact resistant layer of the impact resistant composite laminate may reduce 22%, 35%, 45%, 50%, 60%, 70%, 80%, 85%, 90% or 95% of the impact force, but it is not limited thereto.

Preferably, when the impact resistant composite laminate withstands an impact force, the impact resistant composite laminate may reduce 20% to 99% of the impact force.

In some embodiments, when the impact resistant composite laminate withstands an impact force, the impact resistant composite laminate may reduce 35%, 40%, 50%, 60%, 70%, 80%, 85%, 90% or 95% of the impact force, but it is not limited thereto.

Preferably, the impact resistant composite laminate can achieve Level 1 of European Standard EN1621-1: 2012, which is for motorcyclists' protective clothing against mechanical impact.

More preferably, the impact resistant composite laminate can achieve Level 2 of European Standard EN1621-1: 2012. In the test conditions of EN1621-1: 2012, the test temperature is 23° C., and the impact energy is 50 J. If the mean value of impact energy penetrating through the impact resistant composite laminate remains below 20 kN and none of that in all single strikes is above 30 kN after the impact resistant composite laminate is impacted, the impact resistant composite laminate will achieve Level 2 of EN1621-1: 2012.

Preferably, in the impact resistant composite laminate, the impact resistant layer (e.g., the first impact resistant layer or a combination of the first and second impact resistant layers) may have an impact resistance per unit thickness ranging from 6%/mm or more, but it is not limited thereto. More preferably, in the impact resistant composite laminate, the impact resistant layer may have the impact resistance per unit thickness ranging from 6.5%/mm to 22% mm.

In some embodiments, the TPU foam may be placed in an outer covering such as a bag; or in other embodiments, the impact resistant composite laminate may be placed in an outer covering such as a bag. For example, the material of the outer covering may be a woven fabric, a knit fabric or a nonwoven fabric, but it is not limited thereto. The outer covering may entirely cover the TPU foam/the impact resistant composite laminate, or the outer covering may partially cover the TPU foam/the impact resistant composite laminate; for example, the aforementioned outer covering may have a hollow-out design.

In other embodiments, the impact resistant composite laminate may be used with at least one connecting element such as a bonding belt, a pair of hook-and-loop fasteners or a pair of buckles, but it is not limited thereto.

In some embodiments, the TPU foam/the impact resistant composite laminate may be used for applications of grips of goods, personal protective equipment, machinery safety equipment or medical protective equipment, but it is not limited thereto.

Specifically, the personal protective equipment may comprise helmet linings, glove linings, anti-fall clothing, bandages, safety belt sleeves, footwear reinforcements such as reinforcements of upper linings, tongue linings, toe cap linings, heel counter linings, insoles and midsoles, or protective equipment for work and sports such as helmets, impact protective gears, impact gloves, anti-shock pads, anti-fall pads and shock absorbing pads, but it is not limited thereto.

Specifically, machinery safety equipment may be anti-collision packages for precision instruments, anti-vibration pads, gap-filling materials, interior decoration materials for vehicles, car door anti-collision foam guards or car door anti-collision foam strips, but it is not limited thereto.

Other objectives, advantages and novel features of the disclosure will become more apparent from the following detailed description when taken in conjunction with the accompanying drawings.

DETAILED DESCRIPTION OF THE PREFERRED EMBODIMENTS

Figure 1:
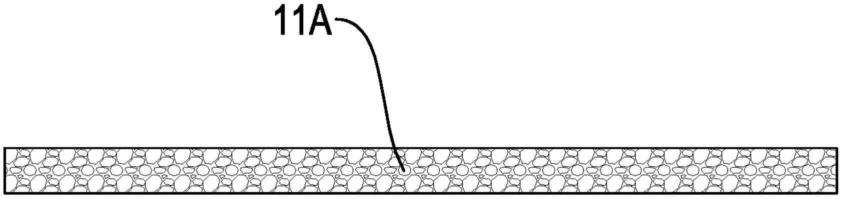
FIG. 1 is a schematic side sectional view of the TPU foam in accordance with the present disclosure.

Hereinafter, one skilled in the arts can easily realize the advantages and effects of the present disclosure from the following examples and comparative examples. Therefore, it should be understood that the descriptions proposed herein are just preferable examples for the purpose of illustrations only, not intended to limit the scope of the disclosure. Various modifications and variations could be made in order to practice or apply the present disclosure without departing from the spirit and scope of the disclosure.

Thermoplastic Polyurethane

The TPUs comprising the structural unit represented by Formula (I) used to form the TPU foam of each Example could be prepared by adapting the synthetic method recorded in TWI697512B or other conventional synthetic methods. The information of chemical formula, CAS No. and the Tg of each of the TPUs comprising the structural unit represented by Formula (I) were listed in Table 1.

TABLE 1

| TPU No. | TPU-1 | TPU-2 | TPU-3 | TPU-4 |
|---|---|---|---|---|
| CAS No. | 2484808-99-1 | | | |
| Weight percentage of the structural unit represented by Formula (I) | 68.1 wt % | 64.9 wt % | 64.9 wt % | 69.9 wt % |
| Value of n in Formula (I) | 7.74 | 3.57 | 5.40 | 5.40 |
| Tg (° C.) | 28.04 | 27.87 | 31.19 | 28 |
| **TPU No.** | **TPU-5** | **TPU-6** | **TPU-7** | **TPU-11** |
| CAS No. | 2484808-99-1 | | | — |
| Weight percentage of the structural unit represented by Formula (I) | 70 wt % | 70 wt % | 65.2 wt % | 56.7 wt % |
| Value of n in Formula (I) | 5.92 | 7.09 | 7.74 | 8.06 |
| Tg (° C.) | 24.88 | 25.54 | 31.02 | −7.04 |
| **TPU No.** | **TPU-8** | **TPU-9** | **TPU-10** | **TPU-12** |
| CAS No. | 2626937-63-9 | | | — |
| Weight percentage of the structural unit represented by Formula (I) | 65.2 wt % | 70 wt % | 67.2 wt % | 58.6 wt % |
| Value of n in Formula (I) | 7.68 | 4.74 | 7.67 | 6.44 |
| Tg (° C.) | 18.28 | 18.03 | 19.25 | 13.27 |

TPU-11 was obtained by a condensation polymerization which used diethylene glycol-phthalic anhydride-based polyester polyol (Mn of 2011 and acid value of 1.0), PEG (PEG1000 purchased from EnHou Polymer Chemical Ind. Co., Ltd.; Mn of 955), 1,4-butanediol and MDI as raw materials. Its chemical formula was $(C_{15}H_{10}N_2O_2{\cdot}C_8H_4O_3{\cdot}C_4H_{10}O_3{\cdot}C_4H_{10}O_2{\cdot}C_2H_4O_2)_X$.

TPU-12 was obtained by a condensation polymerization which used 1,6-hexanediol-phthalic anhydride-based polyester polyol (Mn of 1811 and acid value of 0.77), PEG (PEG1000 purchased from EnHou Polymer Chemical Ind. Co., Ltd.; Mn of 955), 1,4-butanediol and MDI as raw materials. Its chemical formula was $(C_{15}H_{10}N_2O_2{\cdot}C_8H_4O_3{\cdot}C_6H_{14}O_2{\cdot}C_4H_{10}O_2{\cdot}C_2H_4O_2)_X$.

The TPU comprising the structural unit represented by Formula (I) used to form the TPU foam may choose other TPU as long as it comprises the structural unit represented by Formula (I).

Preparation of Thermoplastic Polyurethane Foam

In order to demonstrate the TPU foam obtained from the TPU comprising a structural unit represented by Formula (I) can provide a good impact resistance, TPU foams obtained from each Preparation Example of the present disclosure were respectively made from the aforementioned TPU-1 to TPU-12 only, without adding any plasticizer and impact modifier.

Preparation Method I: A Foaming Process Including a Step of SCF Impregnation of Pellets Followed by a Foaming Step and then a Thermoforming Step TPU-1 pellets were put into an autoclave (0.3 liter stainless steel high-pressure reaction tank), and then the SCF ($CO_2$) was introduced into the autoclave in which the pressure was set at 100 kgf/cm$^2$ and the temperature was at 150° C. After TPU-1 pellets were impregnated for 30 min, the pressure was released and the temperature was decreased, and TPU-1 foam beads were obtained.

Preparation Example 1A (PE 1A): 15 g of TPU-1 foam beads was taken to undergo a thermoforming step by electric heating for 30 seconds (sec), and then cooled to the temperature lower than 70° C.; finally the TPU foam was obtained in a form of hot-plassed plaque. The relevant parameters of thermoforming as follows: upper mold of 140° C.; lower mold of 150° C.; hot-pressed under the pressure of 15 kgf/cm$^2$.

PE 1A had a thickness of 8.75 mm and a density of 0.16 g/cm$^3$. In addition, PE 1A was measured according to ASTM D2632 Standard Method at 23±2° C. to obtain its rebound resilience of 12%.

Preparation Example 1B (PE 1B): 18 g of TPU-1 foam beads which had been preheated in an oven was taken to undergo a thermoforming step by electric heating for 30 sec, and then cooled to the temperature lower than 80° C.; finally the TPU foam was obtained in a form of a hot-pressed plaque. The relevant parameters of thermoforming are as follows: upper mold of 140° C.; lower mold of 150° C.; hot-pressed under the pressure of 15 kgf/cm$^2$.

PE 1B had a thickness of 8.6 mm and a density of 0.18 g/cm$^3$.

Preparation Example 2A (PE 2A): 50 g of TPU-1 foam beads was taken into a mold to undergo a thermoforming step by heating with stream under the pressure of 5 kgf/cm$^2$, and then the TPU foam was obtained in a form of a molded plaque with a thickness of 26.75 mm.

According to ASTM D395 Standard Method, PE 2A was compressed to 25% of its original height to measure its compression set. The compression set measured under 50° C. for a maintained period of 6 hours was 41.16%; the compression set measured under 25° C. for a maintained period of 24 hours was 13.4%.

In addition, PE 2A was measured according to ASTM D2632 Standard Method at 23±2° C. to obtain its rebound resilience of 11%.

Preparation Example 2B (PE 2B): 45 g of TPU-1 foam beads was taken into a mold to undergo a thermoforming step by heating with stream under the pressure of 5 kgf/cm$^2$, and then the TPU foam was obtained in a form of a molded plaque with a thickness of 20 mm and a density of 0.36 g/cm$^3$.

In addition, PE 2B was measured according to ASTM D2632 Standard Method at 23±2° C. to obtain its rebound resilience of 7%.

Preparation Method II: A Foaming Process Including a Step of SCF Impregnation of a Molded Article Followed by a Foaming Step The TPU was subjected to a thermoforming process to obtain a sample of the molded article in a thickness of 2 mm. Or the TPU was subjected to an injection molding process to obtain a sample of the molded article in a thickness of 5 mm. The aforementioned sample was put into an autoclave (100 liters stainless steel high-pressure reaction tank), and then the SCF ($CO_2$) was introduced into the autoclave in which the pressure was set at 150 kgf/cm$^2$ in usual and the temperature was set at the range from 75° C. to 120° C. After an impregnation for 60 min to 240 min, the pressure was released and the temperature was cooled to room temperature, and samples of TPU foam were obtained. All of the samples of the TPU were placed at room temperature for at least one week prior to testing.

Preparation Example 3 (PE 3) to Preparation Example 10 (PE 10), Preparation Example 14 (PE 14) to Preparation Example 17 (PE 17) and Preparation Example 26 (PE 26) to Preparation Example 29 (PE 29) were obtained by the Preparation Method II and the relevant parameters were listed in Table 2; wherein the thickness and the density of each sample were measured just before the impact resistance performance test.

TABLE 2

| Preparation Example No. | TPU No. | Thickness of molded article (mm) | Temp. (° C.) | Impregnation duration (min) | Thickness of foam sample (mm) | Density (g/cm$^3$) |
|---|---|---|---|---|---|---|
| PE 3 | TPU-1 | 5 | 115 | 240 | 6.5 | 0.42 |
| PE 4 | TPU-1 | 5 | 115 | 240 | 8.6 | 0.25 |
| PE 5 | TPU-1 | 5 | 115 | 240 | 7.51 | 0.30 |
| PE 6 | TPU-2 | 2 | 85 | 120 | 2.65 | 0.97 |
| PE 7 | TPU-3 | 2 | 85 | 120 | 2.52 | 0.67 |
| PE 8 | TPU-4 | 2 | 85 | 120 | 2.05 | 1.06 |
| PE 9 | TPU-9 | 2 | 120 | 120 | 4.15 | 0.22 |
| PE 10 | TPU-5 | 2 | 120 | 120 | 3.97 | 0.19 |
| PE 14 | TPU-1 | 5 | 115 | 240 | 5.28 | 0.42 |
| PE 15 | TPU-3 | 2 | 75 | 120 | 2.06 | 1.06 |
| PE 16 | TPU-5 | 2 | 120 | 120 | 3.66 | 0.30 |
| PE 17 | TPU-6 | 2 | 120 | 120 | 3.18 | 0.35 |
| PE 26 | TPU-8 | 2 | 120 | 60 | 2.40 | 0.66 |
| PE 27 | TPU-10 | 2 | 100 | 90 | 3.84 | 0.69 |
| PE 28 | TPU-11 | 2 | 100 | 90 | 2.30 | 0.67 |
| PE 29 | TPU-12 | 2 | 120 | 60 | 2.25 | 0.91 |

Preparation Method III: A Foaming Process Including a Foam IP Step with an SCF

Specifically, the relevant parameters for the foam IP step with an SCF could be referred to as follows: when the supercritical injection molding machine of FCS Group was used, the temperature was set in the range from 165° C. to 180° C.; for example, the feeding temperature was 180° C.; the screw temperature was set at multiple stages such as 180° C., 180° C., 175° C. and 170° C.; the nozzle temperature was 165° C. In addition, the stock was set at 13 bar, with a rotation speed of 32 revolutions per minute (rpm) and at the position of 75 mm. The injection amount of liquid nitrogen SCF was 1.125 g, and the molding cycle time was about 4 min. Finally, the resulting TPU foam board with the hard skin layers had a thickness of 22 mm. The resulting TPU foam board could be sliced to form a TPU foam sheet without the hard skin layers (in the middle of the TPU foam board) and/or at least two TPU foam sheets which had a skin layer on one side of the TPU foam board as Preparation Examples.

All of Preparation Example 11 to Preparation Example 13 and Preparation Example 18 to Preparation Example 25 were obtained by carrying out Preparation Method III with TPU-7 as raw material and using the supercritical injection molding machine of FCS Group; further, they were respectively a TPU foam sheet without the hard skin by slicing the obtained TPU foam board. All of Preparation Example 11 to Preparation Example 13 and Preparation Example 18 to Preparation Example 25 had a density of 0.28 g/$cm^3$, and their thickness was measured just before the impact resistance performance test.

Preparation Example 30 was obtained by carrying out Preparation Method III with TPU-7 as raw material and using the supercritical injection molding machine of FCS Group; further, it was also a TPU foam sheet without the hard skin by slicing the obtained TPU foam board. Preparation Example 30 had a thickness of 6.5 mm and a density of 0.28 g/$cm^3$.

Preparation Example 31 was obtained by carrying out Preparation Method III with TPU-7 as raw material and using the supercritical injection molding machine of FCS Group; further, it was also a TPU foam sheet without the hard skin by slicing the obtained TPU foam board. Preparation Example 31 had a thickness of 6.5 mm and a density of 0.39 g/$cm^3$.

Or, when the supercritical injection molding machine (NexCell KS310-S2) of King Steet Machinery Co., Ltd. was used, the temperature was set in the range from 190° C. to 193° C. and the pressure was set at 8 bar; moreover, the SCF was liquid nitrogen. The obtained TPU foam board (with the hard skin) may have a thickness ranging from 20 mm to 22 mm. When the set density of TPU foam board was about 0.2 g/$cm^3$, the molding cycle time was about 600 sec; and when the set density of TPU foam board was about 0.4 g/$cm^3$, the molding cycle time was about 1440 sec.

Preparation Example 32 was obtained by carrying out Preparation Method III with TPU-7 as raw material and using the supercritical injection molding machine (NexCell KS310-S2) of King Steet Machinery Co., Ltd.; further, it was also a TPU foam sheet without the hard skin by slicing the obtained TPU foam board. Preparation Example 32 had a thickness of 6.6 mm and a density of 0.28 g/$cm^3$. In addition, Preparation Example 32 had a Shore hardness of 55A at 21° C. according to ASTM D2242 Standard Method. Preparation Example 32 had a rebound resilience of 20% at 23±2° C. according to ASTM D2632 Standard Method.

Preparation Example 33 was obtained by carrying out Preparation Method III with TPU-7 as raw material and using the supercritical injection molding machine (NexCell KS310-S2) of King Steet Machinery Co., Ltd.; further, it was also a TPU foam sheet without the hard skin by slicing the obtained TPU foam board. Preparation Example 33 had a thickness of 6.7 mm and a density of 0.39 g/$cm^3$. In addition, Preparation Example 33 had a Shore hardness of 68A at 21° C. according to ASTM D2242 Standard Method. Preparation Example 33 had a rebound resilience of 20% at 23±2° C. according to ASTM D2632 Standard Method.

Preparation Example 34 was obtained by carrying out Preparation Method III with TPU-10 as raw material and using the supercritical injection molding machine (NexCell KS310-S2) of King Steet Machinery Co., Ltd.; further, it was also a TPU foam sheet without the hard skin by slicing the obtained TPU foam board. Preparation Example 34 had a thickness of 8.2 mm and a density of 0.39 g/$cm^3$. In addition, Preparation Example 34 had a Shore hardness of 44A at 21° C. according to ASTM D2242 Standard Method. Preparation Example 34 had a rebound resilience of 7% at 23±2° C. according to ASTM D2632 Standard Method.

Preparation Example 35 was obtained by carrying out Preparation Method III with TPU-10 as raw material and using the supercritical injection molding machine (NexCell KS310-S2) of King Steet Machinery Co., Ltd.; further, it was also a TPU foam sheet without the hard skin by slicing the obtained TPU foam board. Preparation Example 35 had a thickness of 5.6 mm and a density of 0.39 g/$cm^3$. In addition, Preparation Example 35 had a Shore hardness of 44A at 21° C. according to ASTM D2242 Standard Method. Preparation Example 35 had a rebound resilience of 7% at 23±2° C. according to ASTM D2632 Standard Method.

Preparation Example 36 was obtained by carrying out Preparation Method III with TPU-10 as raw material and using the supercritical injection molding machine (NexCell KS310-S2) of King Steet Machinery Co., Ltd.; further, it was also a TPU foam sheet without the hard skin by slicing the obtained TPU foam board. Preparation Example 36 had a thickness of 6.97 mm and a density of 0.28 g/$cm^3$. In addition, Preparation Example 36 had a Shore hardness of 25A at 21° C. according to ASTM D2242 Standard Method. Preparation Example 36 had a rebound resilience of 7% at 23±2° C. according to ASTM D2632 Standard Method.

In addition, TPU-10 was subjected to Preparation Method III by using the supercritical injection molding machine (NexCell KS310-S2) of King Steet Machinery Co., Ltd., so as to obtain a TPU foam board with a density of 0.28 g/$cm^3$. Followed by a slicing process, Preparation Example 37, which was a TPU foam sheet without a hard skin layer, Preparation Example 38, which was a TPU foam sheet with the lower skin layer, and Preparation Example 39, which was a TPU foam sheet with the upper skin layer were obtained. Preparation Examples 37 to 39 respectively had a thickness of 6.8 mm, 6.9 mm and 7.4 mm in order.

Similarly, TPU-10 was subjected to Preparation Method III by using the supercritical injection molding machine (NexCell KS310-S2) of King Steet Machinery Co., Ltd., so as to obtain a TPU foam board with a density of 0.28 g/$cm^3$. Followed by a slicing process, Preparation Example 40, which was a TPU foam sheet without a hard skin layer, Preparation Example 41, which was a TPU foam sheet with the lower skin layer, and Preparation Example 42, which was a TPU foam sheet with the upper skin layer were obtained. Preparation Examples 40 to 42 respectively had a thickness of 6.3 mm, 7.0 mm and 7.84 mm in order.

As shown in FIG. 1, the impact resistant layer 11A was directly formed by the aforementioned TPU foam, so as to facilitate to carry out an analysis for impact resistance performance.

The materials used as the impact resistant layers of each Comparative Example were described as follows.

1. F-C1: a commercial impact resistant material I with a thickness of 7.1 mm, which was taken from D3O (Product No.: DS5115 HYPER KNEE/SHIN); wherein D3O was a composite material which contained PBDMS dispersed throughout the solid foamed PU elastomer matrix.

2. F-C2: a commercial impact resistant material II with a thickness of 10.5 mm, which was taken from D3O (Product No.: ICON GUARD D3O BACK MD 2706-0163).

3. F-C3: an EVA foam with a thickness of 8 mm, which was taken from a commercial volleyball knee pad.

4. F-C4: a hot-pressed plaque whose material comprises the structural unit of PTMEG; with a thickness of 10.6 mm and a density of 0.34 g/cm$^3$; wherein F-C4 was taken from the midsole of commercial Boost shoes.

5. F-C5: a shapeable fiberglass layer taken from a commercial baseball elbow pad without fabrics; wherein the fiberglass layer was composed of a moisture-curable resin and glass fibers; with a thickness of 5.2 mm and a density of 0.9 g/cm$^3$.

6. F-C6: a commercial volleyball knee pad which was composed of an EVA foam covered by fabrics and had a total thickness of 13.2 mm.

7. F-C7: the EVA foam of F-C6 with a thickness of 8.41 mm and a density of 0.1 g/cm$^3$.

8. F-C8: a commercial volleyball knee pad which was composed by a mixture of PU foam and EVA foam; wherein the mixture was covered by fabrics (the ratio of PU foam and EVA foam was indicated as 3:7); F-C8 had a total thickness of 10.35 mm.

9. F-C9: another commercial volleyball knee pad which was composed of an EVA foam covered by fabrics and had a total thickness of 23.4 mm.

10. F-C10: an ETPV foam elastomer with a thickness of 7.1 mm, a Shore hardness of 35C and a density of 0.21 g/cm$^3$; wherein the ETPV foam elastomer was formed by hot press foaming an ETPV resin of E342-35 purchased from Sunko Ink Co., Ltd.; E342-35 was a polymer elastomer material in which vulcanized EPDM microparticles were dispersed in a continuous combination phase of ethylene copolymer and polyolefin block copolymer.

11. F-C11: a commercial EVA foam with a thickness of 3.75 mm.

12. F-C12: a commercial styrofoam board with a thickness of 3.29 mm and a density of 0.0754 g/cm$^3$.

13. F-C13: a thermoformed sheet formed by steam expansion of foamed microballs taken from BASF SE and a thermoforming step; wherein the foamed microballs were identified as TPU foam beads with PTMEG structural units; F-C13 with a thickness of 11.3 mm and a density of 0.30 g/cm$^3$.

Analysis 1: Observation of the Morphology of the TPU Foam

The morphology of Preparation Examples was respectively observed by SEM. The TPU foams of Preparation Example 1A and Preparation Example 4 were taken for example.

Figure 2:
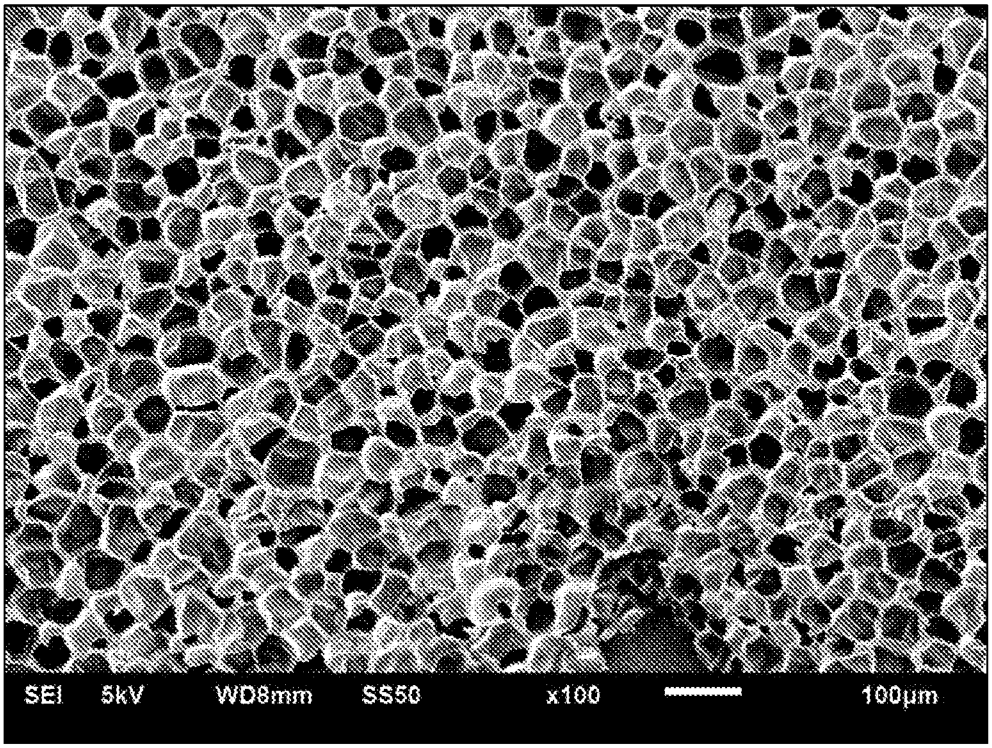
FIG. 2 is a scanning electron microscope (SEM) image of the TPU foam of the Preparation Example 1A.

With reference to FIG. 2, FIG. 2 was a photograph from SEM (×100) of the TPU foam of Preparation Example 1A. As shown in FIG. 2, the cells of the TPU foam of Preparation Example 1A were mainly closed voids in a shape of polyhedron; wherein the cells had a size ranging from 1 μm to 100 μm and the major range of size thereof ranged from 20 μm to 80 μm.

Figure 3:
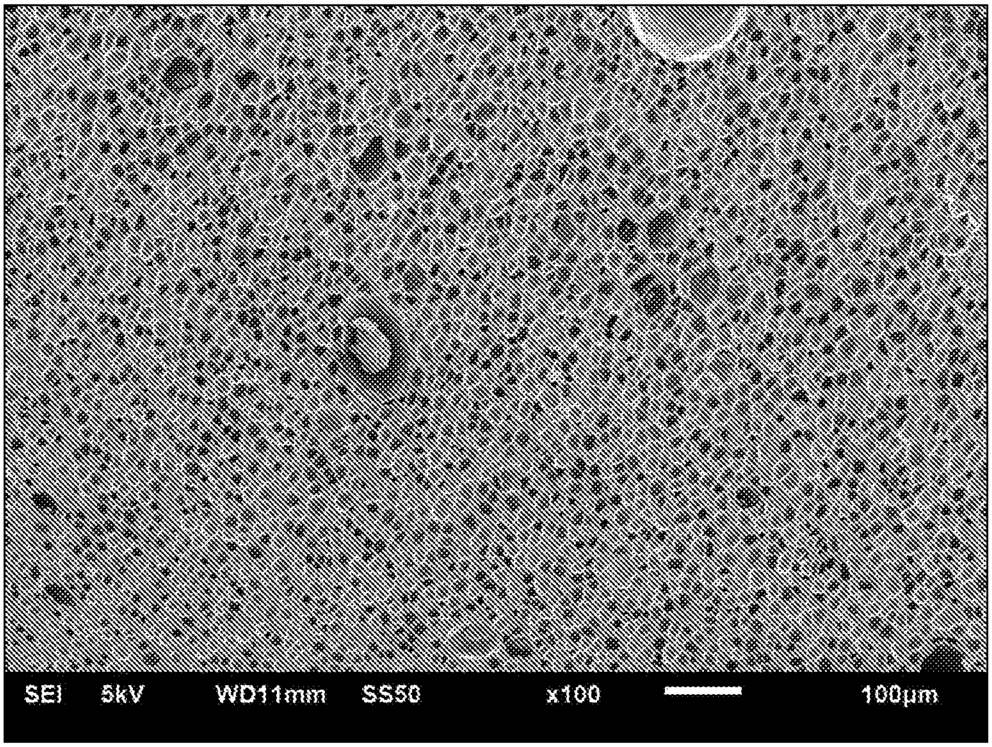
FIG. 3 is a SEM image of the TPU foam of the Preparation Example 4.

With reference to FIG. 3, which was a photograph from SEM (×100) of the TPU foam of Preparation Example 4. As shown in FIG. 3, the cells of the TPU foam of Preparation Example 4 were mainly closed voids in a shape of polyhedron wherein the cells had a size ranging from 1 μm to 150 μm and the major range of size thereof ranged from 10 μm to 50 μm.

Analysis 2: Impact Resistance Performance Test for TPU Foam

In Tables 3 to 5, Table 6-1 and Table 6-2, the impact resistant layers of Examples formed by the aforementioned Preparation Examples and Comparative Examples were respectively analyzed by a shock tester (DP-1200 of KING DESIGN INDUSTRIAL) under a specific test condition, and the resulting "penetrating impact ($F_t$)", "reduced impact ($F_s$)", a reduced impact ratio and the impact resistance per unit thickness of test samples for the impact resistant layers were listed in Tables 3 to 5, Table 6-1 and Table 6-2.

The test conditions used in this test were respectively Test Conditions A to C listed as follows:

1. Test Condition A: a standard weight of 5.0 kg hammer was dropped freely at a height of 1.0 m to hit against test samples vertically, so the potential energy provided by the hammer was about 50 J;
2. Test Condition B: a standard weight of 5.0 kg hammer was dropped freely at a height of 0.5 m to hit against test samples vertically, so the potential energy provided by the hammer was about 25 J;
3. Test Condition C: a standard weight of 5.0 kg hammer was dropped freely at a height of 0.25 m to hit against test samples vertically, so the potential energy provided by the hammer was about 12.5 J.

The "Blank" test refers to an impact force measured by a free drop of the hammer under a specific test condition to directly hit the platform of the shock tester without any test samples thereon; the impact force measured by Blank test could be also called the "original impact ($F_0$)".

The "penetrating impact ($F_t$)" refers to an impact force penetrating through the test sample, measured by a free drop of the hammer under a specific test condition to hit a test sample on the platform of the shock tester.

The "reduced impact ($F_s$)" refers to the impact force that the test sample dissipates when withstanding an external force under the specific test condition. $F_s$ is the difference obtained from $F_0$ minus $F_t$. ($F_s=F_0-F_t$)

The "reduced impact ratio" is a ratio of the "reduced impact ($F_s$)" to the "original impact ($F_0$)"; that is, "reduced impact ratio"$=F_s/F_0$.

The "impact resistance per unit thickness" is a ratio of the "reduced impact ratio" to the thickness of the impact resistant layer; that is, "impact resistance per unit thickness"$=(F_s/F_0)$/thickness.

Impact resistant layers of Example 1 (F-E1) to Example 3 (F-E3) and Example 14 (F-E14) to Example 18 (F-E18) and impact resistant layers of Comparative Example 1 (F-C1) to Comparative Example 3 (F-C3) were all tested for impact resistance under Test Condition A at room temperature (25° C.±2° C.), and the results were listed in Table 3. F-C3 was broken in appearance after the impact resistance performance under Test Condition A.

TABLE 3

| | PE No. | Thickness (mm) | Time domain (mS) | $F_t$ (kN) | $F_s$ (kN) | $F_s/F_0$ | Impact resistance per unit thickness (%/mm) |
|---|---|---|---|---|---|---|---|
| Blank | — | — | 0.7 | 96.35 | — | — | — |
| F-E1 | PE 1A | 8.75 | 2.93 | 27.81 | 68.54 | 71.13% | 8.13 |
| F-E2 | PE 1B | 8.60 | 5.21 | 20.69 | 75.66 | 78.53% | 9.13 |
| F-E3 | PE 3 | 6.50 | 2.02 | 35.05 | 61.3 | 63.62% | 9.79 |
| F-E14 | PE 27 | 3.84 | 1.69 | 50.67 | 45.68 | 47.41% | 12.35 |
| F-E15 | PE 32 | 6.60 | 2.10 | 34.00 | 62.35 | 64.71% | 9.80 |

TABLE 3-continued

| | PE No. | Thick-ness (mm) | Time domain (mS) | $F_t$ (kN) | $F_s$ (kN) | $F_s/F_0$ | Impact resistance per unit thickness (%/mm) |
|---|---|---|---|---|---|---|---|
| F-E16 | PE 37 | 6.80 | 2.33 | 32.96 | 63.39 | 65.79% | 9.68 |
| F-E17 | PE 38 | 6.90 | 2.33 | 34.49 | 61.86 | 64.20% | 9.30 |
| F-E18 | PE 39 | 7.40 | 3.06 | 26.76 | 69.59 | 72.23% | 9.76 |
| F-C1 | — | 7.1 | 2.54 | 42.11 | 54.24 | 56.29% | 7.93 |
| F-C2 | — | 10.5 | 4.25 | 20.06 | 76.29 | 79.18% | 7.54 |
| F-C3 | — | 8 | 0.76 | 93.31 | 3.04 | 3.16% | 0.39 |

Impact resistant layers of Example 4 (F-E4) to Example 8 (F-E8) and Example 19 (F-E19) to Example 25 (F-E25) and impact resistant layers of Comparative Example 4 (F-C4) to Comparative Example 12 (F-C12) were all tested for impact resistance under Test Condition B at room temperature (25° C.±2° C.), and the results were listed in Table 4.

TABLE 4

| | PE No. | Thick-ness (mm) | Time domain (mS) | $F_t$ (kN) | $F_s$ (kN) | $F_s/F_0$ | Impact resistance per unit thickness (%/mm) |
|---|---|---|---|---|---|---|---|
| Blank | — | — | 0.67 | 60.99 | — | — | — |
| F-E4 | PE 4 | 8.60 | 5.98 | 9.27 | 51.72 | 84.80% | 9.86 |
| F-E5 | PE 7 | 2.52 | 1.48 | 37.15 | 23.84 | 39.09% | 15.51 |
| F-E6 | PE 27 | 3.84 | 1.85 | 26.69 | 34.30 | 56.24% | 14.65 |
| F-E7 | PE 10 | 3.97 | 2.96 | 27.93 | 33.06 | 54.21% | 13.65 |
| F-E8 | PE 11 | 6.60 | 3.07 | 16.94 | 44.05 | 72.22% | 10.94 |
| F-E19 | PE 28 | 2.30 | 1.26 | 38.62 | 22.37 | 36.68% | 15.95 |
| F-E20 | PE 29 | 2.25 | 1.75 | 31.64 | 29.35 | 48.12% | 21.39 |
| F-E21 | PE 30 | 6.50 | 2.92 | 16.93 | 44.06 | 72.24% | 11.11 |
| F-E22 | PE 35 | 5.60 | 1.98 | 23.28 | 37.71 | 61.83% | 11.04 |
| F-E23 | PE 40 | 6.30 | 2.34 | 20.32 | 40.67 | 66.68% | 10.58 |
| F-E24 | PE 41 | 7.00 | 3.15 | 14.56 | 46.43 | 76.13% | 10.88 |
| F-E25 | PE 42 | 7.84 | 4.01 | 13.94 | 47.05 | 77.14% | 9.84 |
| F-C4 | — | 10.60 | 3.41 | 30.90 | 30.09 | 49.34% | 4.65 |
| F-C5 | — | 5.2 | 2.14 | 30.31 | 30.68 | 50.30% | 9.67 |
| F-C6 | — | 13.2 | 3.28 | 33.48 | 27.51 | 45.11% | 3.42 |
| F-C7 | — | 8.41 | 0.92 | 57.85 | 3.14 | 5.15% | 0.61 |
| F-C8 | — | 10.35 | 4.20 | 23.18 | 37.81 | 61.99% | 5.99 |
| F-C9 | — | 23.4 | 2.01 | 33.46 | 27.53 | 45.14% | 1.93 |
| F-C10 | — | 7.1 | 0.98 | 49.04 | 11.95 | 19.59% | 2.76 |
| F-C11 | — | 3.75 | 0.78 | 54.40 | 6.59 | 10.81% | 2.88 |
| F-C12 | — | 3.29 | 0.77 | 58.97 | 2.02 | 3.31% | 1.01 |

Impact resistant layers of Example 9 (F-E9) to Example 13 (F-E13) and Example 26 (F-E26) to Example 32 (F-E32) and an impact resistant layer of Comparative Example 13 (F-C4) were all tested for impact resistance under Test Condition C at room temperature (25° C.±2° C.), and the results were listed in Table 5.

TABLE 5

| | PE No. | Thick-ness (mm) | Time domain (mS) | $F_t$ (kN) | $F_s$ (kN) | $F_s/F_0$ | Impact resistance per unit thickness (%/mm) |
|---|---|---|---|---|---|---|---|
| Blank | — | — | 0.68 | 37.24 | — | — | — |
| F-E9 | PE 14 | 5.28 | 2.78 | 11.68 | 25.56 | 68.64% | 13.00 |
| F-E10 | PE 15 | 2.06 | 1.54 | 26.32 | 10.92 | 29.32% | 14.23 |
| F-E11 | PE 16 | 3.66 | 4.76 | 11.32 | 25.92 | 69.60% | 19.02 |
| F-E12 | PE 17 | 3.18 | 4.37 | 12.22 | 25.02 | 67.19% | 21.13 |
| F-E13 | PE 9 | 4.15 | 5.84 | 9.27 | 27.97 | 75.11% | 18.10 |
| F-E26 | PE 27 | 3.84 | 1.93 | 17.16 | 20.08 | 53.92% | 14.04 |

TABLE 5-continued

| | PE No. | Thick-ness (mm) | Time domain (mS) | $F_t$ (kN) | $F_s$ (kN) | $F_s/F_0$ | Impact resistance per unit thickness (%/mm) |
|---|---|---|---|---|---|---|---|
| F-E27 | PE 28 | 2.30 | 2.36 | 13.6 | 23.64 | 63.48% | 27.60 |
| F-E28 | PE 29 | 2.25 | 1.98 | 15.41 | 21.83 | 58.62% | 26.05 |
| F-E29 | PE 30 | 6.50 | 3.04 | 10.44 | 26.80 | 71.97% | 11.07 |
| F-E30 | PE 31 | 6.50 | 2.38 | 16.02 | 21.22 | 56.98% | 8.77 |
| F-E31 | PE 35 | 5.60 | 2.16 | 15.57 | 21.67 | 58.19% | 10.39 |
| F-E32 | PE 36 | 6.97 | 2.91 | 10.34 | 26.90 | 72.23% | 10.36 |
| F-C13 | — | 11.3 | 6.28 | 11.73 | 25.51 | 68.50% | 6.06 |

The impact resistant layers of Example 1-2 (F-E1-2), Example 1-3 (F-E1-3) and F-E1 were all prepared by the TPU foam of PE 1A. The difference among them was the test temperature under Test Condition A, and the results were listed in Table 6-1.

TABLE 6-1

| | Test Temp. | Thick-ness (mm) | Time domain (mS) | $F_t$ (kN) | $F_s$ (kN) | $F_s/F_0$ | Impact resistance per unit thickness (%/mm) |
|---|---|---|---|---|---|---|---|
| Blank | 25° C. | — | 0.7 | 96.35 | — | — | — |
| F-E1 | 25° C. | 8.75 | 2.93 | 27.81 | 68.54 | 71.13% | 8.13 |
| F-E1-2 | 50° C. | 8.75 | 3.48 | 25.65 | 70.70 | 73.38% | 8.39 |
| F-E1-3 | 60° C. | 8.75 | 2.57 | 35.5 | 60.85 | 63.16% | 7.22 |

Similarly, the impact resistant layers of Example 7-2 (F-E7-2) and F-E7 were all prepared by the TPU foam of PE 10. The difference between them was the test temperature under Test Condition B (i.e. F-E7-2 was test at 5° C.), and the results were listed in Table 6-2.

Further, the impact resistant layers of Example 4-2 (F-E4-2) and F-E4 were all prepared by adapting the TPU foam obtained from TPU-1 through Preparation Method II. However, F-E4 and F-E4-2 had a slight difference in thickness and they were tested at different temperatures for the impact resistance performance test under Test Condition B, and the results were listed in Table 6-2.

Similarly, the impact resistant layers of Example 8-2 (F-E8-2), Example 8-3 (F-E8-3) and F-E8 were all prepared by adapting the TPU foam obtained from TPU-7 through Preparation Method III. However, F-E8, F-E8-2 and F-E8-3 had a slight difference in thickness and they were tested at different temperatures for the impact resistance performance test under Test Condition B, and the results were listed in Table 6-2.

TABLE 6-2

| | PE No. | Thick-ness (mm) | Test Temp. | $F_t$ (kN) | $F_s$ (kN) | $F_s/F_0$ | Impact resistance per unit thickness (%/mm) |
|---|---|---|---|---|---|---|---|
| Blank | — | — | 25° C. | 60.99 | — | — | — |
| F-E4 | PE 4 | 8.60 | 25° C. | 9.27 | 51.72 | 84.80% | 9.86 |
| F-E4-2 | PE 5 | 7.51 | 50° C. | 11.17 | 49.82 | 81.69% | 10.88 |
| F-E7 | PE 10 | 3.97 | 25° C. | 27.93 | 33.06 | 54.21% | 13.65 |
| F-E7-2 | PE 10 | 3.97 | 50° C. | 18.84 | 42.15 | 69.11% | 17.41 |
| F-E8 | PE 11 | 6.6 | 25° C. | 16.94 | 44.05 | 72.22% | 10.94 |
| F-E8-2 | PE 12 | 6.67 | 70° C. | 21.61 | 39.38 | 64.57% | 9.68 |
| F-E8-3 | PE 13 | 6.9 | 90° C. | 43.05 | 17.94 | 29.41% | 4.26 |

Analysis 3: Impact Resistance and Resilience Test of Foam Beads

Foam beads in PE 1A and foamed microballs of BASF in F-C13 were respectively put in the same cotton mesh bags to analyze the impact resistance performance. At the same time, the aforementioned cotton mesh bags containing foam beads/microballs were observed whether they would rebound after being hit by an external force.

Wherein, a total thickness of the bag body of each cotton mesh bag was 0.5 mm (that is, the thickness of the single bag wall was 0.25 mm); and the total thickness of each cotton mesh bag filled with foam beams/microballs was 10.0 mm, so it meant the thickness formed by the foam beads/microballs contained in the aforementioned cotton mesh bag was 9.5 mm.

In Table 7-1, the foam beads in PE 1A and the foamed microballs in F-C13 were respectively tested for impact resistance under Test Condition A at room temperature (25° C.±2° C.), and the results were listed in Table 7-1.

In Table 7-2, the foam beads in PE 1A and the foamed microballs in F-C13 were respectively tested for impact resistance under Test Condition B at room temperature (25° C.±2° C.), and the results were listed in Table 7-2.

TABLE 7-1

| | Time domain (mS) | $F_t$ (kN) | $F_s$ (kN) (reduced by foam beads/ foamed microballs) | $F_s/F_0$ | Rebound |
|---|---|---|---|---|---|
| Blank | 0.70 | 96.35 | — | — | — |
| Cotton mesh bag | 0.70 | 96.87 ($F_0$) | — | — | — |
| Foam beads in PE 1A | 1.56 | 59.55 | 37.32 | 38.53% | No |
| Foamed microballs in F-C13 | 0.81 | 92.62 | 4.25 | 4.39% | Yes |

TABLE 7-2

| | Time domain (mS) | $F_t$ (kN) | $F_s$ (kN) (reduced by foam beads/ foamed microballs) | $F_s/F_0$ | Rebound |
|---|---|---|---|---|---|
| Blank | 0.67 | 60.99 | — | — | — |
| Cotton mesh bag | 0.74 | 60.31 ($F_0$) | — | — | — |
| Foam beads in PE 1A | 4.62 | 15.29 | 42.02 | 69.67% | No |
| Foamed microballs in F-C13 | 1.11 | 50.31 | 10.00 | 16.58% | Yes |

Discussion on Impact Resistance of the TPU Foams as Impact Resistant Layers

From the results in Tables 3 to 5, the F-E1 to F-E3 and F-E14 to F-E18 under the Test Condition A, the F-E4 to F-E8 and F-E19 to F-E25 under the Test Condition B and the F-E9 and F-E13 and F-E26 to F-E32 under the Test Condition C, the impact resistant layers which were composed of the TPU foam of the present disclosure indeed reduced at least 20% of the external impact. It demonstrates that the TPU foam, which is prepared by a foaming process from the TPU comprising the structural unit represented by the Formula (I) can provide a good impact resistance performance to cushion external force effectively.

In comparison with available impact-resistant products on the market, D3O (i.e. the commercial impact resistant material used by F-C1 and F-C2) is an excellent impact-resistant product. However, from a comparison between F-E2 and F-C2 in Table 3 and a comparison of F-E3, F-E15, F-E16, F-E17 and F-C1 in Table 3, it can be seen that the impact reduced by the TPU foam of the present disclosure with a thinner thickness could be similar to or even more than the impact reduced by D3O. Moreover, F-E1 to F-E3 and F-E14 to F-E18 respectively had a better impact resistance per unit thickness than that of F-C1 and F-C2. That is, the TPU foam has more excellent impact resistance.

Similarly, from a comparison of F-E4 to F-E8, F-E19 to F-E25 and F-C4 to F-C12 in Table 4 and a comparison of F-E9 to F-E13, F-E26 to F-E32 and F-C13, the TPU foam of the present disclosure also had a better impact resistance per unit thickness. Besides, although the impact resistance of F-C5 was good, it was composed of a composite material containing moisture-curable PUR and glass fibers, which was not a thermoplastic environmentally friendly material. The composite material of F-C5 could neither be reformed after being cured, nor be recycled; therefore, F-C5 could not meet the requirement of circular economy.

Moreover, from the experiment results in Table 6-1 and Table 6-2, the impact resistant layers with the same or similar thickness could reduce a considerable degree of the external impact no matter in a low temperature environment (close to 0° C., such as 5° C.) or a high temperature environment (e.g. 90° C.). It proves that the TPU foam prepared by a foaming process using the TPU comprising the structural unit represented by the Formula (I) indeed has an impact resistance not restricted by the Tg of the TPU. Further, from the experiment results in Table 6-1 and Table 6-2, it shows that the impact resistance per unit thickness provided by the TPU foams in an environment at a temperature ranging from larger than 0° C. to smaller than 90° C. can exhibit an equivalent performance, which represents same impact resistance.

In addition, from the experiment results in Table 7-1 and Table 7-2, even though both of foam beads in PE 1A and foamed microballs in F-C13 were TPU foam beads, the TPU foam beads formed by the TPU comprising the structural unit represented by the Formula (I) had a significantly higher impact resistance. Further, the foam beads in PE 1A would not rebound after being hit by an external impact while the foamed microballs of BASF in F-C13 would rebound. It can be seen that their different responses were caused by their different chemical structures as well as their different performances in absorbing stress.

Impact Resistant Composite Laminate

Figure 4:
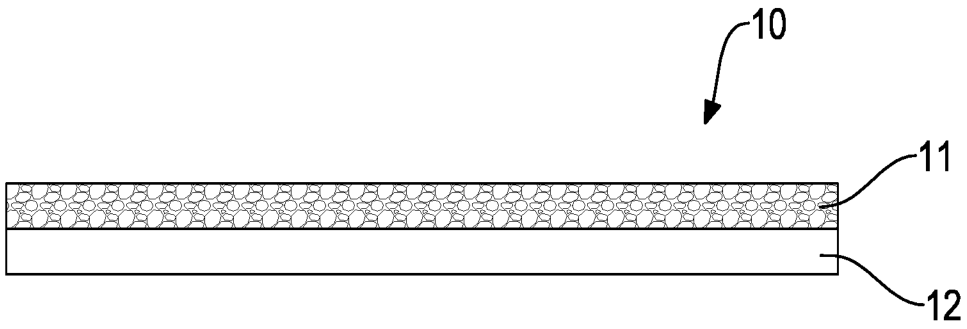
FIG. 4 is a schematic side sectional view of one embodiment of an impact resistant composite laminate in accordance with the present disclosure.

Please refer to the impact resistant composite laminate 10 in FIG. 4, one embodiment of the impact resistant composite laminate of the present disclosure which may have a double-layer structure. Specifically, the impact resistant composite laminate 10 has a base layer 12 and a first impact resistant layer 11 disposed on the base layer 12.

Figure 5:
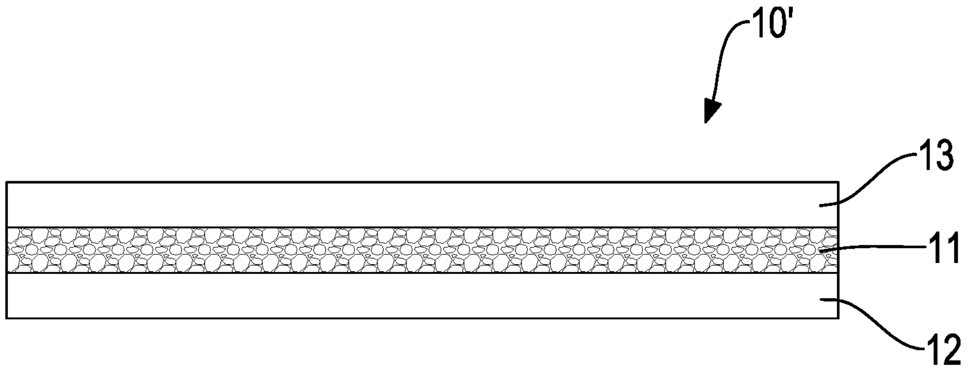
FIG. 5 is a schematic side sectional view of another embodiment of an impact resistant composite laminate in accordance with the present disclosure.

Please refer to the impact resistant composite laminate 10' in FIG. 5, another embodiment of the impact resistant composite laminate of the present disclosure which may have a three-layer structure. Specifically, the impact resistant composite laminate 10' has abase layer 12, a first impact resistant layer 11 disposed on the base layer 12, and a surface layer 13 disposed on the first impact resistant layer 11. That is, the first impact resistant layer 11 is sandwiched between the surface layer 13 and the base layer 12.

Figure 6:
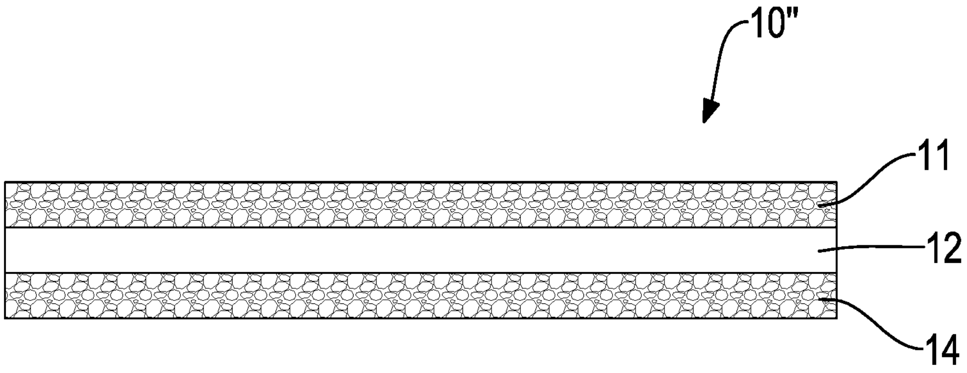
FIG. 6 is a schematic side sectional view of still another embodiment of an impact resistant composite laminate in accordance with the present disclosure.

Referring to the impact resistant composite laminate 10" in FIG. 6, another embodiment of the impact resistant composite laminate of the present disclosure may have a three-layer structure. Specifically, the impact resistant composite laminate 10" sequentially has a first impact resistant layer 11, a base layer 12, and a second impact resistant layer 14. That is, the base layer 12 is sandwiched between the first impact resistant layer 11 and the second impact resistant layer 14.

The impact resistant composite laminates with a double-layer structure were exemplified below: those impact resistant composite laminates comprised the first impact resistant layer overlapping the base layer in each group of Examples and Comparative Examples.

The base layers in each group of Examples and Comparative Examples chose one layer from the layer of Reference Example 1 (M-R1) to the layer of Reference Example 8 (M-R8), and the relevant information thereof is as follows.

1. M-R1, M-R8: a PET woven fabric with a thickness of 2.5 mm.
2. M-R2: a leather with a thickness of 0.86 mm.
3. M-R3: a PC rigid plastic layer with a thickness of 1.93 mm and a Shore hardness of 80D; the PC rigid plastic layer was formed by the PC resin (Makrolon 2405, purchased from Bayer AG) through an injection molding process.
4. M-R4: a PE rigid plastic layer with a thickness of 1.96 mm and a Shore hardness of 60D; the PE rigid plastic layer was formed by the PE resin (HDPE 7501, purchased from Formosa Plastics Co., Ltd.) through a thermoforming process.
5. M-R5, M-R7: a low density polyethylene (LDPE) foam layer with a thickness of 5.25 mm and a Shore hardness of 35C.
6. M-R6: a commercial PET woven cloth with a thickness of 5.7 mm.

The first impact resistant layers of the impact resistant composite laminates of Examples were as described in Table 8.

TABLE 8

| Example No. of impact resistant composite laminate | PE No. of the first impact resistant layer |
|---|---|
| M-E1 | PE 4 |
| M-E2 | PE 18 |
| M-E3 | PE 12 |
| M-E4 | PE 4 |
| M-E5 | PE 19 |
| M-E6 | PE 4 |
| M-E7 | PE 20 |
| M-E8 | PE 4 |
| M-E9 | PE 21 |
| M-E10 | PE 22 |
| M-E11 | PE 23 |
| M-E12 | PE 3 |
| M-E13 | PE 24 |
| M-E14 | PE 10 |
| M-E15 | PE 9 |
| M-E16 | PE 25 |

The relevant information of the impact resistant layers of Comparative Examples were as follows.

1. M-C1, M-C2: the commercial impact resistant material I with a thickness of 7.1 mm, which was taken from D3O (as the same as F-C1).
2. M-C3: formed by stacking three layers of commercial styrofoam boards; each layer with a thickness of about 3.2 mm and a density of 0.05 g/$cm^3$.
3. M-C4, M-C6: a shapeable fiberglass layer taken from a commercial baseball elbow pad; wherein the fiberglass layer was composed of a moisture-curable resin and glass fibers; the shapeable fiberglass layer with a thickness of 5.2 mm and a density of 0.9 g/$cm^3$.
4. M-C5: the EVA foam with a thickness of 8 mm, which was taken from a commercial volleyball knee pad (as the same as F-C3).
5. M-C7: a PU foam taken from a commercial volleyball knee pad; wherein M-C7 had a thickness of 18 mm.
6. M-C8: the EVA foam taken from a commercial knee pad; wherein M-C8 had a thickness of 8.41 mm (as the same as F-C7).

Analysis 4: Impact Resistance Performance Test for Impact Resistant Composite Laminates In Tables 9 to 11, all of the layers of Reference Examples, the impact resistant composite laminates of Examples and Comparative Examples were respectively analyzed by the shock tester which was used in Analysis 2 under the specific test condition, and the resulting "penetrating impact ($F_t$)", "reduced impact of the impact resistant layer ($F_s'$)", "reduced impact ratio of the impact resistant layer" and the impact resistance per unit thickness of the impact resistant layer were listed in Tables 9 to 11. Besides, in the test for impact resistance, the hammer contacted the outer surface of the base layer (i.e. the surface opposite to the surface contacting the impact resistant layer) after falling.

The "Blank" test refers to an impact force measured by a free drop of the hammer under a specific test condition to directly hit the platform of the shock tester without any test samples thereon; the impact force measured by Blank test could also be called the "original impact ($F_0$)".

The "penetrating impact ($F_t$)" refers to a measured impact force, which is a free drop of the hammer under a specific test condition to hit a test sample on the platform of the shock tester.

The "reference impact ($F_0'$)" refers to an impact force penetrating through a test sample, which only is the base layer of the impact resistant composite laminate of Examples, measured by a free drop of the hammer under a specific test condition to hit the test sample on the platform of the shock tester.

The "reduced impact of the impact resistant layer ($F_s'$)" refers to the impact force that the first impact resistant layer of the test sample dissipates when withstanding an external force under the specific test condition. $F_s'$ is the difference obtained from subtracting "penetrating impact ($F_t$)" from "reference impact ($F_0'$)". ($F_s'=F_0'-F_t$)

The "reduced impact ratio of the impact resistant layer" is a ratio of the "reduced impact of the first impact resistant layer ($F_s'$)" to the "reference impact ($F_0'$)"; that is, "reduced impact ratio of the impact resistant layer"=$F_s'/F_0'$.

The "impact resistance per unit thickness of the impact resistant layer" was a ratio of the "reduced impact ratio of the impact resistant layer" to the thickness of the first impact resistant layer; that is, "impact resistance per unit thickness of the impact resistant layer"=($F_s'/F_0'$)/thickness.

The layers of M-R1 to M-R6 and the impact resistant composite laminates of M-E1 to M-E12 and M-C1 to M-C5 were all tested for impact resistance under Test Condition A at room temperature (25° C.±2° C.), and the results were listed in Table 9. Moreover, the impact resistant layer of M-C5 was slightly deformed after the impact resistance performance under Test Condition A.

TABLE 9

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')$/thickness (%/mm) |
| Blank | — | — | 0.7 | 96.35 | — | — | — |
| M-R1 | 2.5 | — | 0.71 | 98.46 | — | — | — |
| M-E1 | 2.5 | 8.60 | 5.47 | 20.84 | 77.62 | 78.83% | 9.17 |
| M-E2 | 2.5 | 7.81 | 2.65 | 33.02 | 65.44 | 66.46% | 8.51 |
| M-E3 | 2.5 | 6.67 | 2.28 | 36.55 | 61.91 | 62.88% | 9.43 |
| M-C1 | 2.5 | 7.1 | 2.78 | 37.26 | 61.20 | 62.16% | 8.75 |
| M-R2 | 0.86 | — | 0.75 | 86.92 | — | — | — |
| M-E4 | 0.86 | 8.60 | 5.47 | 20.84 | 66.08 | 76.02% | 8.84 |
| M-E5 | 0.86 | 8.15 | 2.31 | 36.25 | 50.67 | 58.29% | 7.15 |
| M-C2 | 0.86 | 7.1 | 2.68 | 37.61 | 49.31 | 56.73% | 7.99 |
| M-R3 | 1.93 | — | 0.71 | 100.3 | — | — | — |
| M-E6 | 1.93 | 8.60 | 5.72 | 18.01 | 82.29 | 82.04% | 9.54 |
| M-E7 | 1.93 | 7.95 | 4.10 | 31.28 | 59.01 | 58.83% | 7.40 |
| M-C3 | 1.93 | 9.60 | 0.86 | 90.29 | 10.01 | 9.98% | 1.04 |
| M-R4 | 1.96 | — | 0.76 | 90.78 | — | — | — |
| M-E8 | 1.96 | 8.60 | 6.01 | 16.73 | 74.05 | 81.57% | 9.48 |
| M-E9 | 1.96 | 7.96 | 2.42 | 35.61 | 55.17 | 60.77% | 7.63 |
| M-R5 | 5.25 | — | 0.8 | 82.86 | — | — | — |
| M-E10 | 5.25 | 5.65 | 2.48 | 41.27 | 41.59 | 50.19% | 8.88 |
| M-E11 | 5.25 | 6.35 | 3.87 | 35.04 | 47.82 | 57.71% | 9.09 |
| M-C4 | 5.25 | 5.20 | 1.70 | 58.79 | 24.07 | 29.05% | 5.59 |
| M-R6 | 5.7 | — | 0.9 | 86.2 | — | — | — |
| M-E12 | 5.7 | 6.50 | 3.36 | 32.25 | 53.95 | 62.59% | 9.63 |
| M-C5 | 5.7 | 8.00 | 1.19 | 73.18 | 13.02 | 15.10% | 1.89 |

The layer of M-R7 and the impact resistant composite laminates of M-E13 and M-C6 were all tested for impact resistance under Test Condition B at room temperature (25° C.±2° C.), and the results were listed in Table 10.

TABLE 10

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')$/thickness (%/mm) |
| Blank | — | — | 0.67 | 60.99 | — | — | — |
| M-R7 | 5.25 | — | 0.99 | 53.57 | — | — | — |
| M-E13 | 5.25 | 5.59 | 5.12 | 14.48 | 39.09 | 72.97% | 13.05 |
| M-C6 | 5.25 | 5.2 | 2.53 | 30.39 | 23.18 | 43.27% | 8.32 |

The layer of M-R8 and the impact resistant composite laminates of M-E14 to M-E16 and M-C7 to M-C8 were all tested for impact resistance under Test Condition C at room temperature (25° C.±2° C.), and the results were listed in Table 11.

TABLE 11

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')$/thickness (%/mm) |
| Blank | — | — | 0.68 | 37.24 | — | — | — |
| M-R8 | 2.5 | — | 1.48 | 29.3 | — | — | — |
| M-E14 | 2.5 | 3.97 | 6.36 | 6.92 | 22.38 | 76.38% | 19.24 |
| M-E15 | 2.5 | 4.36 | 7.65 | 5.86 | 23.44 | 80.00% | 18.35 |
| M-E16 | 2.5 | 6.70 | 5.12 | 8.46 | 20.84 | 71.13% | 10.62 |
| M-C7 | 2.5 | 18 | 4.06 | 14.47 | 14.83 | 50.61% | 2.81 |
| M-C8 | 2.5 | 8.41 | 6.92 | 10.84 | 18.46 | 63.00% | 7.49 |

From the results in Tables 9 to 11, all of the impact resistant composite laminates indeed reduced at least 20% of the external impact. It demonstrates that the impact resistant composite laminate of the present disclosure is able to provide a good impact resistance.

In Table 9, $F_t$ of the layer of M-R1 and $F_t$ of the layer of M-R3 were even higher than $F_0$. The reason may be that the layers of M-R1 and M-R3 had almost no impact resistance; therefore, when they withstood a strong impact under Test Condition A, they would produce a reaction force rather than dissipate a part of the impact.

Moreover, from a comparison of the "impact resistance per unit thickness of the impact resistant layer" of the impact resistant composite laminates of M-E1 to M-E3 and M-C1 in Table 9, the first impact resistant layers prepared by the TPU foam of the present disclosure exhibited a comparable impact resistance per unit thickness to the commercial impact resistant material "D3O", and even M-E1 to M-E3 respectively had a better "impact resistance per unit thickness of the impact resistant layer" than that of D3O.

Similarly, from a comparison of the "impact resistance per unit thickness of the impact resistant layer" of the impact resistant composite laminates of M-E4 to M-E5 and M-C2 in Table 9, the first impact resistant layers prepared by the TPU foam of the present disclosure exhibited a comparable impact resistance per unit thickness to the commercial impact resistant material "D3O", and even M-E4 had a better "impact resistance per unit thickness of the impact resistant layer" than that of D3O.

Further, D3O is a composite material, which contains PBDMS evenly distributed in the solid foamed PU elastomer matrix, but D3O is not a thermoplastic environmentally friendly material; in addition, D3O cannot change its shape once it is cured, and it cannot be recycled to satisfy the requirement of circular economy. On the other hand, the TPU foam of the present disclosure can be recycled and reused, thereby meeting the requirement of circular economy.

In addition, from a comparison between M-E10 and M-C4 in Table 9 and a comparison between M-E13 and M-C6 in Table 10, in the cases of the impact resistant layer having the same or similar thickness, the first impact resistant layers formed by the TPU foam of the present disclosure had a better impact resistance per unit thickness than that of the shapeable fiberglass layer (i.e. the fiberglass layer was composed of a moisture-curable resin and glass fibers).

In addition, from a comparison between M-E12 and M-C5 in Table 9 and a comparison between M-E14 to M-E16 and M-C8 in Table 11, the first impact resistant layers formed by the TPU foam of the present disclosure obviously had an excellent impact resistance per unit thickness than that of the EVA foam.

In summary, in view of the aforementioned results of Analyses 1 to 4, the TPU foam obtained by a foaming process from the TPU comprising the structural unit represented by Formula (I) of the present disclosure can provide a good impact resistance when the TPU foam is used as an impact resistant layer; moreover, the impact resistant composite laminate comprising the aforesaid impact resistant layer can even have a better impact resistance per unit thickness, which are proven as the unexpected results.

Application Example 1

Figure 7:
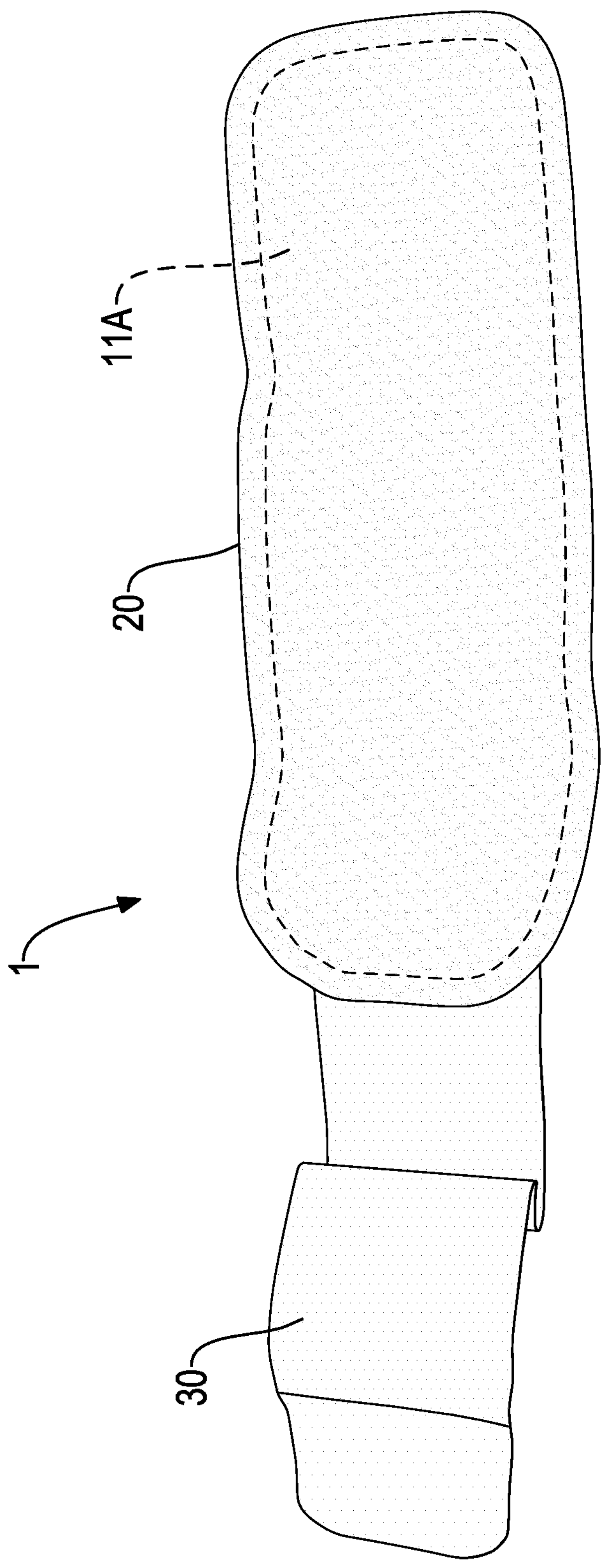
FIG. 7 is a schematic diagram of the Application Example 1.

With reference to FIG. 7, a personal protective equipment 1 of Application Example 1 is a wrist bracer. The personal protective equipment 1 may be obtained by the following step. First, the impact resistant layer 11A of F-E4 is pressed and cut to a desired size; next, the cut impact resistant layer 11A is put into a long bag body 20, and a set of connecting elements 30 such as a pair of hook-and-loop fasteners are installed at opposite ends of the bag body 20.

When the personal protective equipment 1 is put on the user's wrist, the bag body 20 containing the impact resistant layer 11A will be wound around the user's wrist, and hook and loop of the set of connecting elements 30 should be adjusted to an appropriate position for fastening. If the user wants to remove the personal protective equipment 1, the user just needs to separate the set of connecting elements 30.

The TPU foam of the present disclosure can be easily shaped at a temperature equal to or slightly higher than human body temperature, so the personal protective equipment 1 comprising the impact resistant layer 11A not only fits the corresponding body part covered by the personal protective equipment 1, but also can be repeatedly re-shaped at an elevated temperature. Accordingly, the personal protective equipment 1 has a high practicality.

In other application examples, the impact resistant layer 11A may be subjected to a hole-punching step prior to putting into the bag body, so the impact resistant layer 11A may have penetrating holes, so as to improve its air permeability.

In other application examples, the impact resistant layer 11A in the personal protective equipment 1 of Application Example 1 may be replaced to an impact resistant composite laminate comprising a TPU foam of the present disclosure, such as the impact resistant composite laminate 10 shown in FIG. 4, the impact resistant composite laminate shown 10' in FIG. 5, and the impact resistant composite laminate 10" shown in FIG. 6.

Even though numerous characteristics and advantages of the present disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A thermoplastic polyurethane foam, prepared by a foaming process from a raw material comprising a thermoplastic polyurethane; wherein the thermoplastic polyurethane comprises a structural unit represented by Formula (I):

(I)

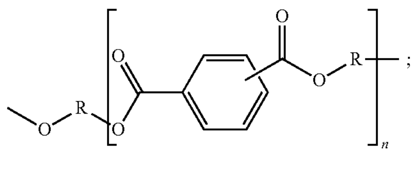

in Formula (I), each R independently is an alkylene group having 2 to 8 carbon atoms, $—CH_2CH_2OCH_2CH_2—$ or $—CH_2CH_2OCH_2CH_2OCH_2CH_2—$;

n is a number from 3.57 to 13; and the structural unit represented by Formula (I) has a number-average molecular weight ranging from 700 grams per mole (g/mole) to 2500 g/mole.

2. The thermoplastic polyurethane foam according to claim 1, wherein the thermoplastic polyurethane comprises a structural unit represented by Formula (II):

(II)

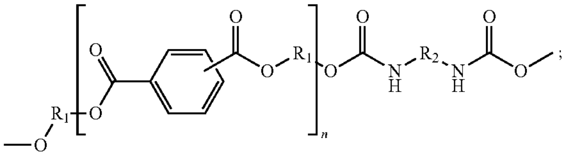

in Formula (II), each $R_1$ independently is an alkylene group having 2 to 8 carbon atoms or $—CH_2CH_2OCH_2CH_2—$ or $—CH_2CH_2OCH_2CH_2OCH_2CH_2—$;

$R_2$ is

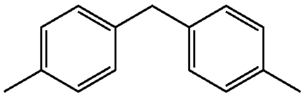

or

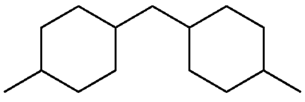

;

and n is a number from 3.57 to 13.

3. The thermoplastic polyurethane foam according to claim 2, wherein the thermoplastic polyurethane comprises a first thermoplastic polyurethane with the structural unit represented by Formula (II) in which $R_1$ is $—CH_2CH_2OCH_2CH_2—$ and $R_2$ is

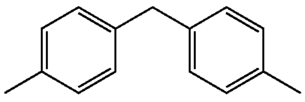

, a second thermoplastic polyurethane with the structural unit represented by Formula (II) in which $R_1$ is $—(CH_2)_6—$ and $R_2$ is

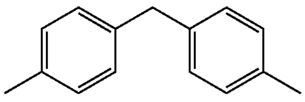

, a third thermoplastic polyurethane produced by a diol with a structural unit represented by Formula (I), polyethylene glycol, butanediol and methylene diphenyl diisocyanate, a fourth thermoplastic polyurethane produced by a diol with a structural unit represented by Formula (I), polytetramethylene ether glycol, butanediol and methylene diphenyl diisocyanate, or any combinations thereof.

4. The thermoplastic polyurethane foam according to claim 1, wherein the foaming process is a physical foaming process.

5. The thermoplastic polyurethane foam according to claim 4, wherein the physical foaming process is a supercritical foaming molding.

6. The thermoplastic polyurethane foam according to claim 5, wherein the supercritical foaming molding comprises: a foaming process including a step of supercritical fluid impregnation of pellets followed by a foaming step and then a thermoforming step, a foaming process including a step of supercritical fluid impregnation of a molded article followed by a foaming step, a foaming process including a foam injection press step with a supercritical fluid, a foaming process including a thermoforming step of foam beads obtained by pelletizing extrusion with a supercritical fluid or a foaming process including a supercritical fluid extrusion molding step.

7. The thermoplastic polyurethane foam according to claim 1, wherein the thermoplastic polyurethane foam has a thickness ranging from 1.5 millimeters to 30 millimeters.

8. The thermoplastic polyurethane foam according to claim 7, wherein the thermoplastic polyurethane foam has the thickness ranging from 4 millimeters to 15 millimeters.

9. The thermoplastic polyurethane foam according to claim 7, wherein the thermoplastic polyurethane foam achieves Level 1 of European Standard EN1621-1:2012.

10. The thermoplastic polyurethane foam according to claim 1, wherein the thermoplastic polyurethane foam has a density ranging from 0.15 $g/cm^3$ to 1.10 $g/cm^3$.

11. An impact resistant composite laminate comprising a base layer and a first impact resistant layer overlapping the base layer; wherein the first impact resistant layer is formed by the thermoplastic polyurethane foam according to claim 1.

12. The impact resistant composite laminate according to claim 11, wherein the base layer comprises a rigid plastic layer, a foam elastomer, a woven fabric, a knit fabric, a nonwoven fabric, a leather, a fiberglass layer or any combinations thereof.

13. The impact resistant composite laminate according to claim 11, wherein the impact resistant composite laminate further comprises a surface layer, and the first impact resistant layer is disposed between the surface layer and the base layer; wherein the surface layer comprises a rigid plastic layer, a foam elastomer, a woven fabric, a knit fabric, a nonwoven fabric, a leather, a fiberglass layer or any combinations thereof.

14. The impact resistant composite laminate according to claim 11, wherein the impact resistant composite laminate further comprises a second impact resistant layer, and the base layer is disposed between the first impact resistant layer and the second impact resistant layer; wherein the second impact resistant layer is formed by the thermoplastic polyurethane foam according to claim 1.

15. The impact resistant composite laminate according to claim 13, wherein the impact resistant composite laminate further comprises a second impact resistant layer, and the base layer is disposed between the first impact resistant layer and the second impact resistant layer; wherein the second impact resistant layer is formed by the thermoplastic polyurethane foam according to claim 1.

16. The impact resistant composite laminate according to claim 11, wherein the impact resistant composite laminate is used for applications of handles, personal protective equipment, machinery safety equipment or medical protective equipment.

17. The impact resistant composite laminate according to claim 11, wherein the impact resistant composite laminate achieves Level 1 of European Standard EN1621-1:2012.

18. The impact resistant composite laminate according to claim 17, wherein the first impact resistant layer has a thickness ranging from 4 millimeters to 15 millimeters.

* * * * *